(12) United States Patent
Tokura

(10) Patent No.: US 9,055,174 B2
(45) Date of Patent: Jun. 9, 2015

(54) APPARATUS AND NON-TRANSITORY COMPUTER-READABLE MEDIUM

(71) Applicant: Masashi Tokura, Konan (JP)

(72) Inventor: Masashi Tokura, Konan (JP)

(73) Assignee: BROTHER KOGYO KABUSHIKI KAISHA, Nagoya-shi (JP)

( * ) Notice: Subject to any disclaimer, the term of this patent is extended or adjusted under 35 U.S.C. 154(b) by 0 days.

(21) Appl. No.: 14/224,964

(22) Filed: Mar. 25, 2014

(65) Prior Publication Data

US 2014/0293376 A1 Oct. 2, 2014

(30) Foreign Application Priority Data

Mar. 26, 2013 (JP) ................. 2013-064006

(51) Int. Cl.
*H04N 1/04* (2006.01)
*H04N 1/00* (2006.01)

(52) U.S. Cl.
CPC ................. *H04N 1/00795* (2013.01)

(58) Field of Classification Search
CPC ......... H04N 5/232; H04N 13/02; H04N 1/00; H04N 1/60; H04N 7/18; H04N 1/028; H04N 5/235; H04N 5/262; H04N 13/00; H04N 13/04; H04N 1/024; H04N 5/217; H04N 5/225; B65H 2220/02; B65H 2220/03; B65H 7/08; B65H 2403/923; B65H 2555/25; B65H 2557/2644
USPC .......... 358/1.9, 1.13, 1.5, 406, 475, 496, 497, 358/498, 504, 518, 521; 399/301, 49, 74, 399/16, 36, 388, 69, 72; 382/167, 254, 112, 382/128, 141, 154, 195, 264, 274
See application file for complete search history.

(56) References Cited

U.S. PATENT DOCUMENTS

| | | | | |
|---|---|---|---|---|
| 5,373,371 | A * | 12/1994 | Masui | 358/444 |
| 5,907,666 | A * | 5/1999 | Yano et al. | 358/1.9 |
| 5,940,114 | A * | 8/1999 | Kataoka et al. | 347/248 |
| 6,671,069 | B1 * | 12/2003 | Kurosawa et al. | 358/1.9 |
| 6,954,233 | B1 * | 10/2005 | Ito | 348/350 |
| 7,102,797 | B2 * | 9/2006 | Sakai | 358/461 |
| 7,190,845 | B2 * | 3/2007 | Iida | 382/274 |
| 7,499,193 | B2 * | 3/2009 | Nishikawa | 358/1.9 |
| 7,576,886 | B2 * | 8/2009 | Kimura | 358/1.9 |
| 7,869,092 | B2 * | 1/2011 | Nakatani et al. | 358/1.9 |
| 7,916,346 | B2 * | 3/2011 | Matsuzaki et al. | 358/1.9 |
| 8,274,716 | B2 * | 9/2012 | Sugiyama | 358/514 |

(Continued)

FOREIGN PATENT DOCUMENTS

JP 2005-230917 A 9/2005

*Primary Examiner* — Negussie Worku
(74) *Attorney, Agent, or Firm* — Fox Rothschild LLP

(57) ABSTRACT

An apparatus includes first and second moving mechanisms and a processor. The processor causes apparatus to instruct the second moving mechanism to move a holding member to a reading unit, instruct the reading unit to read first image data that is an image of mark on the holding member, calculate an amount of deviation of a first set position of the holding member by the second moving mechanism in the first image data, from a reference set position of an object, instruct the second moving mechanism to move the holding member to a reading unit, instruct the reading unit to read second image data of a pattern, generate processing data based on the second image data, correct the processing data based on the deviation amount, and control the moving mechanisms based on the corrected processing data to process the object by the pen or the cutter.

15 Claims, 15 Drawing Sheets

(56) References Cited

U.S. PATENT DOCUMENTS

| | | | |
|---|---|---|---|
| 8,446,477 B2 * | 5/2013 | Irisawa et al. | 348/208.11 |
| 8,593,683 B2 * | 11/2013 | Ikari | 358/1.9 |
| 8,599,413 B2 * | 12/2013 | Morita et al. | 358/1.15 |
| 8,724,980 B2 * | 5/2014 | Hongu | 396/82 |
| 8,817,329 B2 * | 8/2014 | Satoh et al. | 358/1.9 |
| 8,867,107 B1 * | 10/2014 | Shimizu | 358/474 |
| 2005/0186010 A1 | 8/2005 | Shibata et al. | |

* cited by examiner

[FULL DATA]

| NUMBER OF PATTERNS | |
|---|---|
| PATTERN A | FIRST COORDINATE DATA<br>SECOND COORDINATE DATA<br>THIRD COORDINATE DATA<br>FOURTH COORDINATE DATA<br>FIFTH COORDINATE DATA |
| DELIMITER DATA | |
| PATTERN B | FIRST COORDINATE DATA<br>SECOND COORDINATE DATA<br>THIRD COORDINATE DATA<br>⋮<br>(N+1)-TH COORDINATE DATA |
| DELIMITER DATA | |
| PATTERN C | FIRST COORDINATE DATA<br>SECOND COORDINATE DATA<br>THIRD COORDINATE DATA<br>⋮<br>(N+1)-TH COORDINATE DATA |
| DELIMITER DATA | |

FIG.7

APPARATUS AND NON-TRANSITORY COMPUTER-READABLE MEDIUM

CROSS-REFERENCE TO BELATED APPLICATIONS

This application is based upon and claims the benefit or priority from the prior Japanese Patent Application No. 2013-064006 filed on Mar. 26, 2013, the entire contents of which are incorporated herein by reference.

BACKGROUND

1. Technical Field

The present disclosure relates to an apparatus provided with a cartridge holder receiving a pen or a cutter and a non-transitory computer-readable medium storing data of instructions for the apparatus.

2. Related Art

Cutting plotters have been conventionally known as an apparatus automatically executing a cutting process. An object to be cut is a sheet-shaped object (paper sheet, for example). The sheet is held on a base material having an adhesive layer on a surface thereof. The base material serves as a holding member. The sheet is applied to the adhesive layer. The cutting plotter moves the base material holding the sheet, in a first direction while holding both ends of the base material vertically between a driving roller and a pinch roller. The cutting plotter further moves a carriage with a cutting blade in a second direction perpendicular to the first direction. A desired pattern is cut out of the sheet by the above-described operation.

SUMMARY

The cutting plotter has been proposed to be equipped with an image reading device provided with a scanner. In this case, a user attaches a sheet printed with a pattern to the holding member. The holding member is transferred so that the image on the sheet surface is read by the scanner. Cutting data of the pattern can be generated on the basis of the image data. As a result, cutting plotter then executes a cutting process based on the generated cutting data, with the result that a pattern printed on the sheet can be cut based on the generated cutting data.

The holding member is sometimes set on the cutting plotter while being slightly inclined relative to the first direction. In this case, the holding member is transferred in the inclined state and the image on the sheet surface is read by the scanner. As a result, an image of the read sheet is inclined, and cutting data is generated based on the inclined image. Subsequently, the holding member is to be once discharged from the cutting plotter. Assume now that the holding member is re-set on the cutting plotter so that the sheet is cut based on the generated cutting data. In this case, further assume that the holding member is set so as to be inclined in a direction opposed to the direction in the previous case. When the sheet is cut in the abode-described state, a cutting position is misaligned relative to the pattern printed on the sheet. Accordingly, the user is required to accurately set the holding member on the cutting plotter so that the holding member is prevented from being inclined. This poses a problem that accurate setting is troublesome.

Therefore, an object of the disclosure is to provide an apparatus which can apply appropriate processing based on image data read by the reading unit and a non-transitory computer-readable medium storing data of instructions for the apparatus.

The present disclosure provides an apparatus comprising a cartridge holder configured to receive a pen or a cutter, a platen configured to receive a holding member holding an object, a first moving mechanism configured to move the cartridge holder in a direction that the cartridge holder comes close to the platen, a reading unit configured ID read image data from the object and the holding member, a second moving mechanism configured to move the holding member to the reading unit, and a processor configured to cause the apparatus to instruct the second moving mechanism to move the holding member to the reading unit, instruct the reading unit to read first image data that is an image of a mark provided on the holding member, calculate an amount of deviation of a first set position of the holding member by the second moving mechanism in the first image data read by the reading unit, from a reference set position of the object, instruct the second moving mechanism to move the holding member to the reading unit, instruct the reading unit to read second image data that is an image of a pattern applied to the object held on the holding member, generate processing data based on the second image data read by the reading unit, correct the generated processing data based on the deviation amount, and control the first and second moving mechanisms based on the corrected processing data to process the object held on the holding member, by the pen or the cutter.

The disclosure also provides a non-transitory computer-readable medium for an apparatus comprising a cartridge holder configured to receive a pen or a cutter, a platen configured to receive a holding member holding an object, a first moving mechanism configured to move the cartridge holder in a direction that the cartridge holder comes close to the platen, a reading unit configured to read image data from the object, a second moving mechanism configured to move the holding member to the reading unit, and a processor configured to cause the apparatus to instruct the second moving mechanism to move the holding member to the reading unit, instruct the reading unit to read first image data that is an image of a mark provided on the holding member, calculate an amount of deviation of a first set position of the holding member by the second moving mechanism in the first image data read by the reading unit, from a reference set position of the object, instruct the second moving mechanism to move the holding member to the reading unit, instruct the reading unit to read second image data that is an image of a pattern applied to the object held on the bolding member, generate processing data based on the second image data read by the reading unit, correct the generated processing data based on the deviation amount, and control the first and second moving mechanisms based on the corrected processing data to process the object held on the holding member, by the pen or the cutter.

The disclosure further provides an apparatus comprising a pen or at cutter, a platen configured to receive a holding member holding an object, a first moving mechanism configured to move the pen or the cutter in a direction that the pen or the cutter comes close to the platen, to reading unit configured to read image data from the object and the holding member, a second moving mechanism configured to move, the holding member to the reading unit, and as processor configured to cause the apparatus to instruct the second moving mechanism to move the holding member to the reading unit, instruct the reading unit to read first image data that is an image of a mark provided on the holding member, calculate an amount of deviation of a first set position of the holding, member by the second moving mechanism in the first image data read by the reading unit, from a reference set position of the object, instruct the second moving mechanism to move the holding member to the reading unit, instruct the reading unit to read second image data that is an image of as pattern applied to the object held on the holding member, generate processing data based on the second image data read by the reading unit, correct the generated processing data based on the amount of deviation, and control the first and second moving mechanisms based on the corrected processing data to process the object held on the holding member, by the pen or the cutter.

BRIEF DESCRIPTION OF THE DRAWINGS

In the accompanying drawings:

FIG. 7 illustrates an example of a structure of processing data;

DETAILED DESCRIPTION

Figure 1:
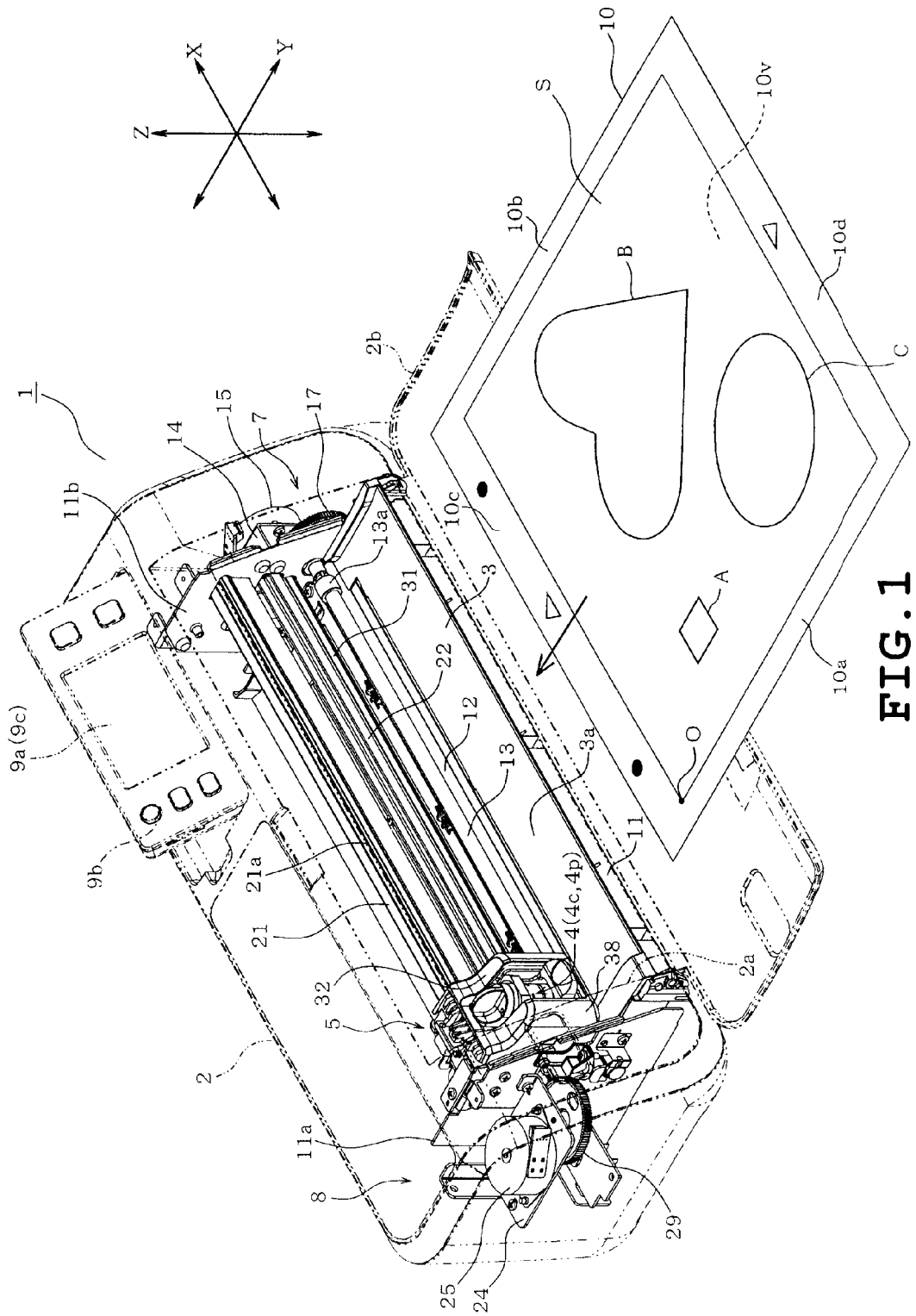
FIG. 1 is an example of a perspective view of a processing apparatus, showing an inner structure thereof and a body cover.

A first example of an apparatus will be described with reference to the drawings. Referring to FIG. 1, a processing apparatus 1 is shown and includes a body cover 2 serving as a housing, a platen 3 provided in the body cover 2, a processing head 5 on which a cartridge 4 is to be mounted and a scanner 6 (see FIGS. 2 and 6) serving as an image reading unit. The processing apparatus 1 further includes a holding sheet 10 for holding an object S. The object S is to be processed, by the processing apparatus 1 or to be read by the image reading unit.

In the processing apparatus 1, a plurality of cutters C and a plurality of pen cartridges 4p are prepared as the cartridge 4. One of the cartridges 4c and 4p is selectively attached to a cartridge holder 32 of a processing head 5 as will be described later. All the cartridges 4c and 4p include respective cases having substantially the same shape (see cases 50 in FIGS. 4A and 4B). All the cartridges 4c and 4p will be hereinafter referred to as "cartridge 4" for the sake of simplicity.

The body cover 2 is formed into the shape of a horizontally long rectangular box. The body cover 2 has a front formed with an opening 2a. A front cover 2b is mounted on the front of the body cover 2 to open and close the opening 2a. The holding sheet 10 holding the object S is set onto the platen 3 while the opening 2a is open. The cartridge 4 is also attached to and detached from a cartridge holder 32 while the opening 2a is open.

The processing apparatus 1 includes a transfer mechanism 7 which transfers the holding sheet 10 set on the platen 3 in a predetermined transfer direction. The processing apparatus 1 also includes a head moving mechanism 8 which moves a processing head 5 in a direction intersecting with the transfer direction of the holding sheet 10 (for example, a direction perpendicular to the transfer direction). In the following description, the direction in which the holding sheet 10 is transferred by the transfer mechanism 7 will be referred to as "front-rear direction". That is, the side of the opening 2a of the processing apparatus 1 will be referred, to as "front" and the opposite side will be referred to as "rear." As shown in FIG. 1, a front-rear direction will be referred to as "Y direction" and the right-left direction will be referred to as "X direction."

A display 9a and an operation switch device 9b including various operation switches are mounted on a right upper surface of the body cover 2. The display 9a is comprised of a full-color liquid display device and configured as a display unit which displays various pattern shapes, images obtained by the scanner 6, necessary messages to the user, and the like. The operation device 9b is operated by the user when various input contents are entered. A touch panel 9c is placed on a display surface side of the display 9a. The operation device 9b is operated by the user when various input contents are entered. A touch panel 9c is placed on a display surface side or the display 9a. When operating the operation switches of the operation switch device 9b or the touch panel 9c, the user can designate an object to be displayed on a screen of the display 9a, select various pattern shapes, switch various operation modes and set various parameters.

Figure 2:
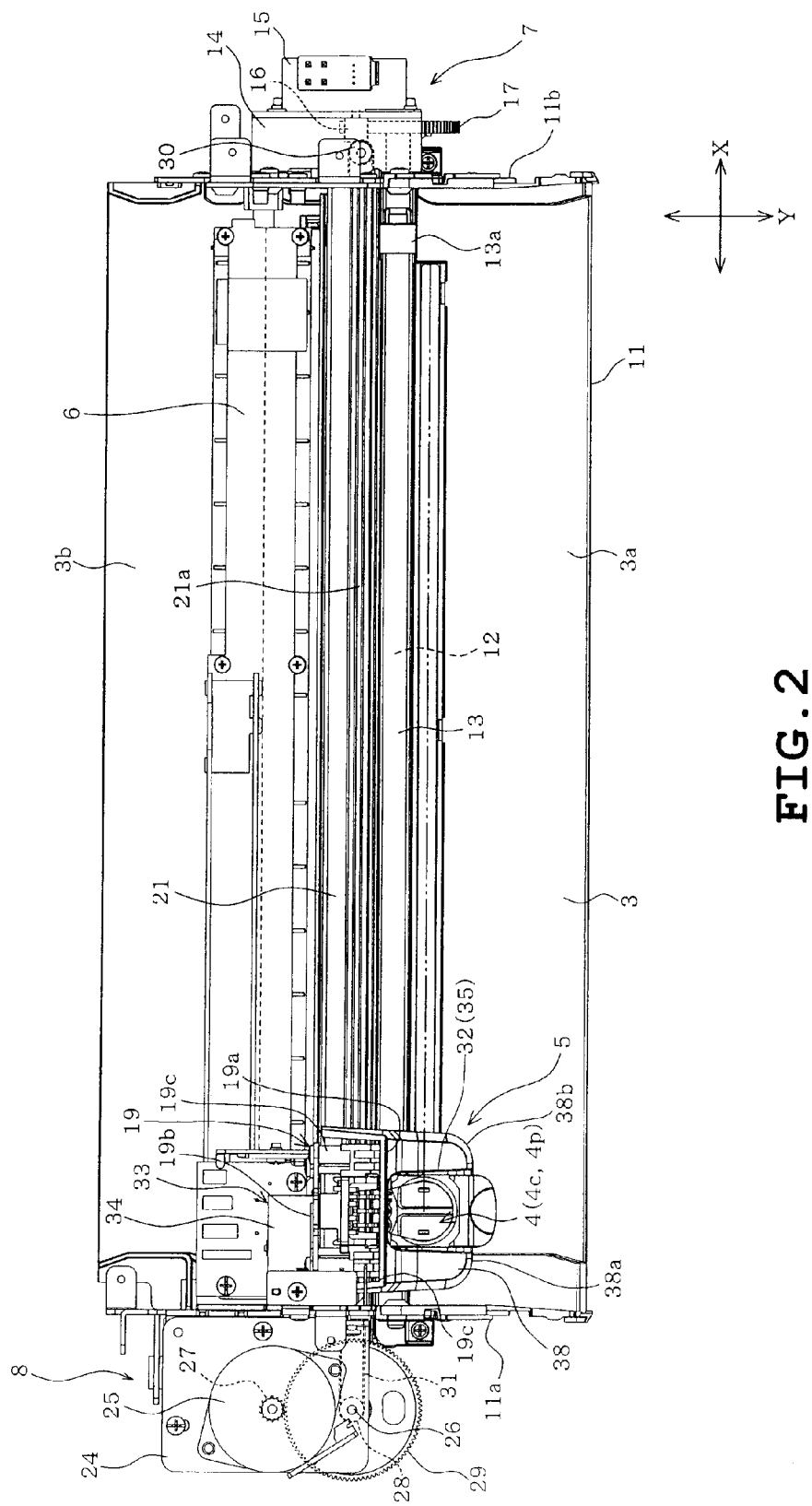
FIG. 2 is an example of a plan view of the processing apparatus, showing the inner structure thereof.

The platen 3 receives the underside of the holding sheet 10 when the object S is processed. The platen 3 includes a front platen 3a and a rear platen 3b and has a horizontal upper surface as shown in FIG. 2. The holding sheet 10 holding the object S is transferred while being placed on the platen 3. The holding sheet 10 is made of a synthetic resin material and formed into a rectangular sheet shape. The holding member 10 has an upper surface including peripheral edges 10a to 10d and an inner region to which an adhesive agent is applied thereby to be formed into an adhesive layer 10v (see FIG. 1). The user affixes the object S to the adhesive layer 10v with the result that the object S is held by the holding sheet 10. The adhesive layer 10v has an adhesive force which is set so that the object S is immovably held reliably in the cutting by the cutter 44 or the printing by the pen 45 and so that the object S can be easily removed after the processing. The transfer mechanism 7 and the head moving mechanism 8 are constructed into a relative movement unit which moves the holding sheet 10 holding the object S in the X direction and the processing head 5 in the Y direction relative to each other.

Firstly, the transfer mechanism 7 transfers the holding sheet 10 on the upper surface side of the platen 3 freely in the Y direction. A frame 11 is enclosed in the body cover 2 as shown in FIGS. 1 and 2. The frame 11 includes right and left sidewalls 11b and 11a which are located at right and left sides of the platen 3 so as to face each other, respectively. A driving roller 12 and a pinch roller 13 are counted on both sidewalls 11a and 11b so as to be located in a space between the front and rear platens 3a and 3b. The driving roller 12 and the pinch roller 13 extend in the right-left direction and lined in the up-down direction. The pinch roller 13 is located above the driving roller 12.

The driving roller 12 has an upper end which is substantially level with the upper surface of the platen 3 and right and left ends mounted on the right and left sidewalls 11b and 11a respectively so that the driving roller 12 is rotatable. The right end of the driving roller 12 extends rightward through the right sidewall 11b as shown in FIG. 2. A driven gear 17 having a large diameter is secured to a right distal end of the driving roller 12. A mounting frame 14 is fixed to an outer surface of the right sidewall 11b. A Y-axis motor 15 comprised of a stepping motor, for example is mounted on the mounting frame 14. The Y-axis motor 15 has an output shaft to which is fixed a driving gear 16 which has a small diameter and is to be brought into mesh engagement with the driven gear 17.

The pinch roller 13 has right and left ends mounted on the right and left sidewalls 11b and 11a respectively so that the pinch roller 13 is rotatable and slightly displaceable in the up-down, direction. Two springs (not shown) are mounted on the outer surfaces of the right and left sidewalls 11b and 11a to normally bias the pinch roller 13 downward. Accordingly, the pinch roller 13 is normally biased downward (to the driving roller 12 side) by the springs. Two rollers 13a having a slightly larger diameter are mounted on the pinch roller 13 so as to be located near both ends thereof respectively. Only the right roller 13a is shown in FIGS. 1 and 2.

The right and left ends 10b and 10a of the holding sheet 10 are thus held between the driving roller 12 and the rollers 13a of the pinch roller 13. Upon drive of the Y-axis motor 15, normal or reverse rotation of the Y-axis motor 15 is transmitted via the gears 16 and 17 to the driving roller 12, whereby the holding sheet 10 is transferred rearward or forward. The transfer mechanism 7 is thus constituted by the driving roller 12, the pinch roller 13, the Y-axis motor 15 and the gears 16 and 17 serving as a reduction mechanism.

The head moving mechanism 8 serves to move the carriage 19 of the processing head 5 freely in the X direction. More specifically, as shown in FIGS. 1 and 2, a pair of guide rails 21 and 22 are fixed to the right and left sidewalls 11b and 11a so as to be located slightly rear above the pinch roller 13. The guide rails 21 and 22 extend in the right-left direction substantially in parallel to the pinch roller 13. Guide grooves are formed in an upper surface of the guide rail 21 and an underside of the guide rail 22 so as to extend between the right and left ends although only the guide groove 21a of the upper surface is shown.

Furthermore, the carriage 19 has a pair of protrusions engaging the guide grooves 21a and 21b respectively although the grooves are not shown. The protrusions are formed on the upper and lower sides so as to hold the guide grooves 21a therebetween in the up-down direction. Thus, the carriage 19 is supported by the engagement of the protrusions and the guide grooves 21a so as to be slidable on the guide rails 21 and 22 in the right-left direction.

A horizontal mounting frame 24 is fixed to the outer surface of the left sidewall 11a so as to be located near the rear of the left sidewall 11a at the outer surface side, as shown in FIGS. 1 and 2. An X-axis motor 25 is mounted on a rear part of the left mounting frame 24 to a downward direction. Furthermore, a vertically extending pulley shaft 26 (see FIG. 2) is mounted on the mounting frame 24. The X-axis motor 25 is comprised of a stepping motor, for example and has an output shaft to which a driving gear 27 having a small diameter is fixed. A timing pulley 28 and a driven gear 29 having a large diameter are rotatably mounted on the pulley shaft 26. The timing pulley 28 and the driven gear 29 are configured to be rotated together.

On the other hand, a timing pulley 30 is mounted on the right mounting frame 14 so as to be rotatable about an axis extending in the up-down direction. An endless timing belt 31 horizontally extends between the timing pulleys 30 and 28 in the right-left direction. The timing belt 31 has a midway part joined to a mounting part (not shown) of the processing head 5.

Upon drive of the X-axis motor 25, normal or reverse rotation of the X-axis motor 25 is transmitted via the gears 27 and 29 and the timing pulley 28 to the timing belt 31, whereby the processing head 5 is moved leftward or rightward together with the carriage 19. Thus, the carriage 19 is moved freely in the right-left direction perpendicular to the direction in which the object S is conveyed. The head moving mechanism 8 is thus constituted by the guide rails 21 and 22, the X-axis motor 25, the gears 27 and 29 serving as a reduction mechanism, the timing pulleys 28 and 30, the timing belt 31 and the like.

Figure 3:
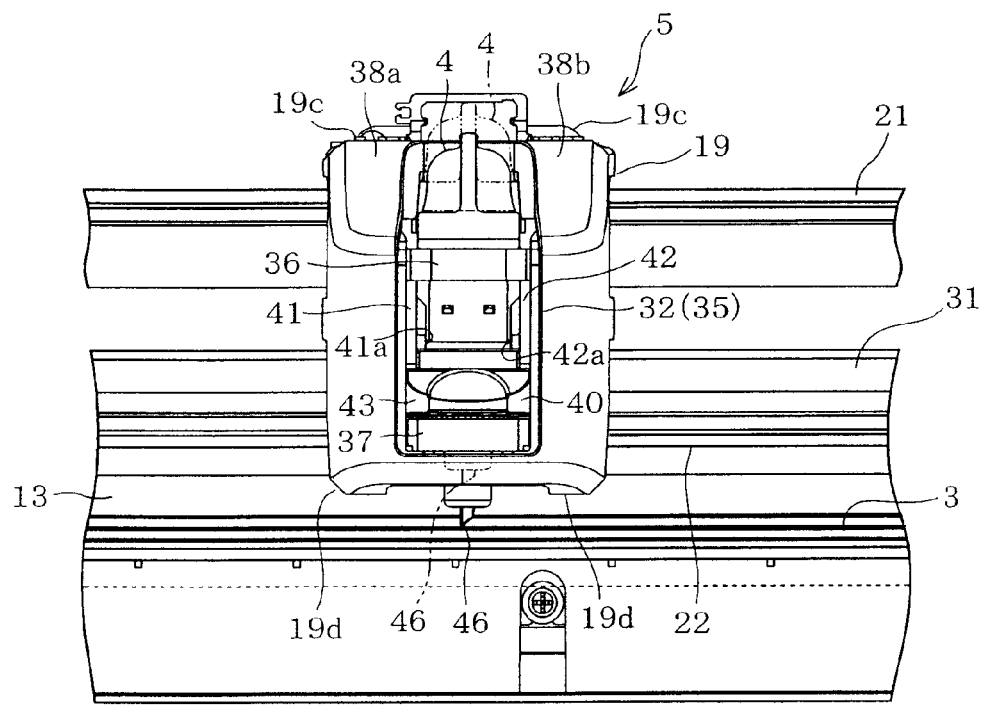
FIG. 3 is an example of a front view of a processing head and its periphery.
Figure 5:
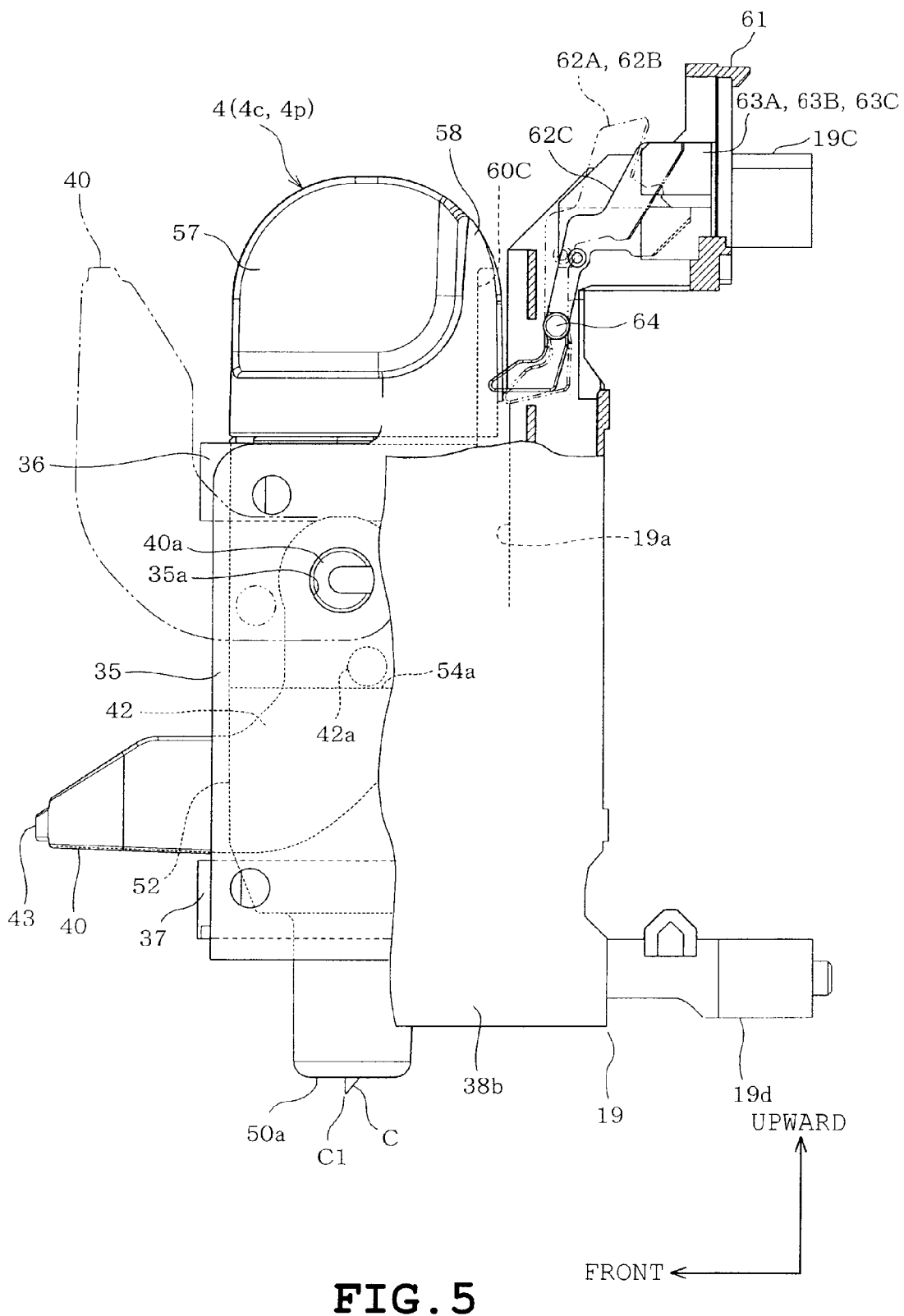
FIG. 5 is an example of a right side view of a cartridge holder and its vicinity with a cover member being partially broken in the state where the cartridge is attached.

The processing head 5 includes an up-down drive mechanism 33 and a cartridge holder 32 disposed in the rear and in front of the carriage 19 as shown in FIG. 2. The up-down drive mechanism 33 is configured to drive the cartridge holder 32 in the up-down direction (the Z direction) together with the cartridge 4. The carriage 19 includes front and rear walls 19a and 19b and upper and lower arms 19c and 19d connecting the walls 19a and 19b, as shown in FIGS. 2, 3 and 5. Thus, the carriage 19 is shaped so as to surround the front and rear sides and upper and lower sides of the guide rails 21 and 22. A Z-axis motor 34 (see FIG. 2) is mounted so that an axis thereof is directed frontward. The Z-axis motor 34 is comprised of a stepping motor, for example. A transmission mechanism (not shown) is provided between the Z-axis motor 34 and the cartridge holder 32. The transmission mechanism reduces a rotational speed of the Z-axis motor 34 and converts rotation of the Z-axis motor 34 to up-down movement of the cartridge holder 32, transmitting the up-down movement. The transmitting mechanism and the Z-axis motor 34 constitute an up-down drive mechanism 33.

Figure 4A:
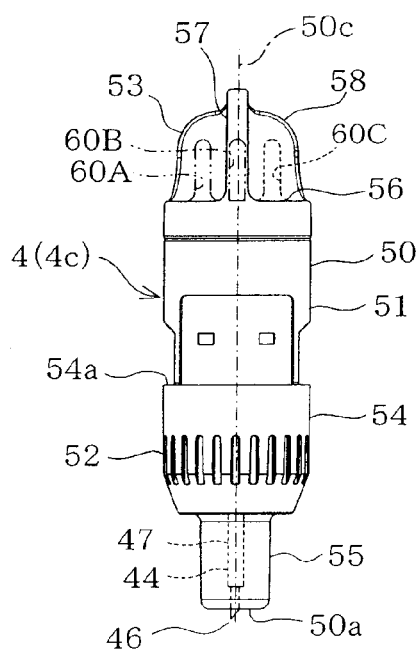
FIGS. 4A and 4B are examples of front views of examples of a cutter cartridge and a pen cartridge respectively.
Figure 4B:
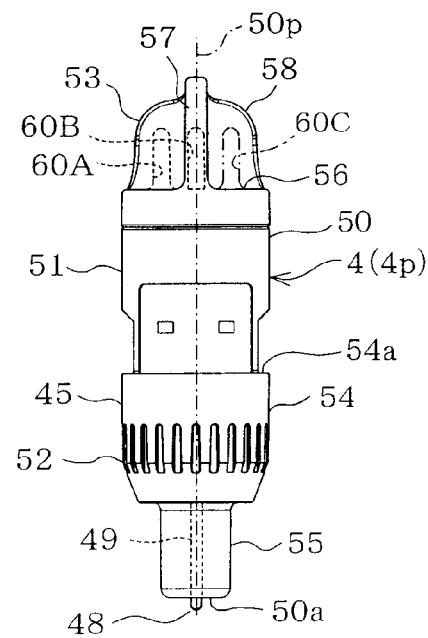

Upon drive of the Z-axis motor 34, normal or reverse rotation of the Z-axis motor 34 is converted via the transmission mechanism to the up-down movement, whereby the cartridge holder 32 is moved upward or downward together with the cartridge 4. As a result, the cartridge holder 32 is moved together with the cartridge 4 between a lowered position and a raised position. When located at the lowered position, the cartridge 4 of the cartridge holder 32 carries out cutting by a cutter 44 or printing by a pen 45 as shown in FIGS. 4A and 4B. When the cartridge 4 of the cartridge holder 32 is located at the raised position, the blade edge 46 or the pen tip 48 is spaced away from the object S by a predetermined distance (see two-dot chain line in FIG. 3).

When the cartridge 4c of the cutter 44 is attached to the cartridge holder 32 and is located at the lowered position, the blade edge 46 penetrates the object S. Pressure of the blade edge 46 for the cutting in this case will be referred to as "cutter pressure." On the other hand, when the cartridge 4p of the pen 45 is attached to the cartridge holder 32 and is located at the lowered position, the pen tip 48 abuts on the object S. Pressure of the pen tip 48 for the cutting in this case will be referred to as "pen pressure." The cutter pressure and the pen pressure are set to pressure values suitable for the cutting and the printing by a control circuit 71 based on an amount of rotation of the Z-axis motor 34, respectively.

The cartridge holder 32 includes a holder frame 35 and upper and lower holders 36 and 37 as shown in FIGS. 2, 3 and 5. The holder frame 35 is driven upward and downward by the up-down drive mechanism 33. The upper and the lower holders 36 and 37 are fixed to the holder frame 35. More specifically, a cover member 38 is provided on the front wall 19a of the carriage 19 so as to cover right and left sides of the front wall 13a from front. The holder frame 35 serving as movable part is disposed between a left projection part 33a and a right projection 38b of the cover member 38. The holder frame 35 is formed into a C-shape (see FIG. 2) and has a top, underside and front all of which are open. The upper and lower holders 36 and 37 are attached so chat the cartridge 4 is inserted through the both holders from above. The upper and lower holders 36 and 37 are each formed into a frame shape housed in the holder frame 35.

The holder frame 35 is provided with a lever member 40 located between the upper and the lower holders 36 and 37 as shown in FIGS. 3 and 5. The lever member 40 has a pair of right and left arms 41 and 42 and an operating portion 43 which is provided so as to connect between distal end sides of the arms 41 and 42. Furthermore, the lever member 60 has a proximal end formed with pivot portions 40a and 40b located at outer surface sides of the arms 41 and 42 respectively. Only the right pivot portion 40a is shown in FIG. 5. The holder frame 35 has right and left sidewalls formed with circular holes respectively. Only right circular hole 35a is shown. The pivot portions 40a and 40b are inserted through circular holes 35a respectively. The arms 41 and 42 include respective inner surface sides provided with small columnar engagement portions 41a and 42a (see FIGS. 3 and 5). The engagement portions 41a and 42a are formed so as to be engageable with engaged portions 54a of the cartridge 4 respectively.

As a result, the lever member 40 is swung about the pivot portions 40a serving as a center of swinging motion so as to be switchable between an open position shown by alternate long and two short dashes line in FIG. 5 and a fixed position show by solid line in FIG. 5. As shown in FIG. 5, the engagement portions 41a and 42a engage the engaged portions 54a respectively when the lever member 40 is located at the fixed position. As the result of the engagement, the cartridge 4 is fixed to the lower holder 37 (the cartridge holder 32). On the other hand, when operated so as to be pulled frontward, the lever member 40 is swung from the fixed position to the open position. With this swing, the engagement portions 41a and 42a depart from the respective engaged portions 54a, whereby the lever member 40 is released from the fixed state.

The cartridge 4 which is detachably attached to the cartridge holder 32 will now be described. FIGS. 4A and 4B exemplify cartridges 4c and 4p of the cutter 44 and the pen 45 respectively. As shown, the cartridge 4c of the cutter 44 and the cartridge 4p of the pen 45 include the same case 50 and are selectively attached to the cartridge holder 32. More specifically, the case 50 includes a case body 51, the cap 52 and a knob 53. The cap 52 and the knob 53 are provided on one end and the other end of the body 51 respectively. The case body 51 is formed into a cylindrical shape and extends in the up-down direction.

The cap 53 includes a larger-diameter portion 54 and a smaller-diameter portion 55 and is accordingly formed into the shape of a stepped bottomed cylindrical container. The larger-diameter portion 54 is fitted with a lower end of the case body 51. The larger-diameter portion 54 has an upper end serving as an engaged portion 54a which abuts on the engagement portions 41a and 42a of the lever member 40. The larger-diameter portion 54 has a lower end which is fitted with the lower holder 37 of the cartridge holder 32. The cap 52 has an underside 50a formed into a flat shape. The underside 50a has a through hole (not shown) through which the blade edge 46 of the cutter 44 or the pen tip 48 is inserted. The knob 53 has a cover plate 56, a knob plate 57 and a rear plate 58 both provided on an upper part of the cover plate 56. The cover plate 56 is fixed to an upper end of the case body 51. The knob plate 57 is mounted on a central part of the cover plate 56 in the right-left direction so as to be directed vertically.

The cartridge 4c shown in FIG. 4A includes the cutter 44 serving as a cutting unit. The cutter 44 has a proximal end or a cutter shaft 47 and a distal end (a lower end) or the blade edge 46, both of which are formed integrally with the cutter 44. The cutter shaft 47 is formed into a round bar shape and is housed in the case 50. The blade of the cutter 44 is formed into a substantially triangular shape tilted relative to the object S although not shown in detail in the drawings. Furthermore, bearings are provided in the case body 51 to support the cutter shaft 47 so that the cutter shaft 47 is rotatable about a central axis 50c thereof. The blade edge 46 protrudes from the underside 50a of the cap 52. The cartridge 4c is constructed so that a central axis 50c of the cutter shaft 47 corresponds with a central axis of the cap 52.

The cartridge 4p shown in FIG. 4B is a printing instrument formed into the pen 45 and has a distal end or the pen tip 48 from which ink is caused to seep. An ink tank (not shown) is provided in the case body 51 to supply ink to a pen tip member 49. The pen tip 48 protrudes from the underside 50a of the cap 52. The cartridge 4p is constructed so that a central axis 50p of the pen tip 48 corresponds with a central axis of the cap 52.

Any one of three grooves 60A to 60C is formed in the rear plate 58 of the knob 53 so that the rear plate 58 is a concavo-convex portion, as shown in FIGS. 4A and 4B. The grooves 60A to 60C have different concave-convex patterns according to types of the cartridges 4. More specifically, for example, the cutting cartridge 4c or the printing cartridge 4p can be discriminated based on presence or absence of the groove 60C at the right end of the rear plate 58, as shown in FIGS. 4A and 4B. In other words, for example, the cartridges 4c and 4p as shown in respective FIGS. 4A and 4B differ from each other in the presence or absence of the groove 60C at the right end of the rear plate 58. The groove 60C can discriminate between the cutting cartridge 4c and the printing cartridge 4p. Furthermore, for example, the color type of the pen 45 can be discriminated based on presence or absence of the grooves 60A and 60B of the cart ridge 4p.

The carriage 19 is provided with a detection unit which is located at an upper side facing the rear plate 58 of the cartridge 4, as shown in FIG. 5. The detection unit may include, for example, three contacts 62A to 62C and three type detection sensors 63A to 63C all provided on a substrate holder 61.

The type detection sensors 63A to 63B mounted on a substrate of the substrate holder 61 so as to be arranged from side to side. The type detection sensors 63A to 63C are comprised of optical sensors (photointerrupters). The contacts 62A to 62C are formed into the shape of a plate extending over the side of the type detection sensors 63A to 63C. The contacts 62A to 62C have lengthwise middle portions formed with shafts 64 respectively. The substrate holder 61 is provided with bearings (not shown) swingably supporting the shafts 64 respectively. The contacts 62A to 62C are supported by the respective bearings so as to be lined in the direction of plate thickness. Three extension coil springs (not shown) extend between upper portions of the contacts 62A to 62C and the substrate holder 61 respectively. The contacts 62A to 62C are biased by the extension coil springs in a direction such that the upper portions of contacts 62A to 62C are tilted toward the type detection sensors 63A to 63C respectively. In other words, the biasing forces of the extension coil springs act in a direction such that lower ends of the contacts 62A to 62C come into contact with the rear plate 58 of the knob 53.

For example, when the cartridge 4c of the cutter 44 is attached to the cartridge holder 32, the lower ends of the contacts 62A and 62B come into contact with the rear plate 58, thereby swinging. With the swinging, the upper ends of the contacts 62A and 62B are departed from the type detection sensors 63A and 63B respectively (see two-dot chain line in FIG. 5). On the other hand, the lower end of the other contact 62C remains tilted toward the groove 60C of the rear plate 58. Accordingly, the upper end of the contact 62C is maintained in a tilted state so as to be fitted at the type detection sensor 63C side.

The cartridge 4c of the cutter 44 is attached to the cartridge holder 32 in cutting the object S. In this case, the control circuit 71 identifies the type of the cartridge 4c, based on detection signals of the contacts 62A to 62C generated by the type detection sensors 63A to 63C respectively. The control circuit 71 then controls the up-down drive mechanism 33 to move the cartridge 4c to the lowered position and sets the blade edge 46 to the above-mentioned cutter pressure. In this case, the blade edge 46 penetrates the objects on the holding sheet 10 to be put slightly into the holding sheet 10. In this state, the holding sheet 10 and the cartridge 4c (the cutter 44) are moved in the X and Y directions relative to each other by the transfer mechanism 7 and the head moving mechanism 8, respectively. The cutting of the object S is executed by this relative movement.

On the other hand, the cartridge 4p of the pen 45 is attached to the cartridge holder 32 in printing the object S. In this case, the control circuit 71 identifies the type of the cartridge 4p, based on detection signals of the contacts 62A to 62C generated by the type detection sensors 63A to 63C respectively. The control circuit 71 then controls the up-down drive mechanism 33 to move the cartridge 4p to the lowered position and sets the pen tip 48 to the above-mentioned pen pressure. In this case, the pen tip 48 penetrates the object S. In this state, the holding sheet 10 and the cartridge 4p (the pen 45) are moved in the X and Y directions relative to each other by the transfer mechanism 7 and the head moving mechanism 8, respectively. The printing of the object S is executed by this relative movement.

The processing apparatus 1 according to the example is provided with a scanner 6 serving as an image obtaining unit shown in FIG. 3. The scanner 6 is comprised of a contact image sensor (CIS), for example. The scanner 6 includes a line sensor including a plurality of image pickup devices lined in the right-left direction, a light source (a lamp) and lens, all of which are composed integrally. The scanner 6 has a length substantially the same as the width of the holding sheet 10 and extends in the right-left direction. The scanner 6 is disposed in the rear of the guide rail 22 and directed downward. The scanner 6 has an underside having a read part which reads an image on the surface of the object S while being in proximity to the upper surface of the object S.

The scanner 6 is controlled by the control circuit 71. More specifically, the control circuit 71 controls the transfer mechanism 7 to move the holding sheet 10 rearward or in the Y direction. The control circuit 71 controls the scanner 6 so that a reading operation by the scanner 6 (scanning in the X direction) is repeatedly executed in synchronization with the movement of the holding sheet 10. The control circuit 71 obtains two-dimensional image data of the object S by the above-described control manner. The carriage 19 has an underside provided with a sheet detection sensor 76 (see FIG. 6). The sheet detection sensor 76 detects a distal end position of the holding sheet 10 set on the platen 3 and accordingly a Y-directional position of the holding sheet 10. A detection signal generated by the sheet detection sensor 76 is supplied to the control circuit 71.

Furthermore, the control circuit 71 is configured to process the image data of the object S read by the scanner 6 in a known image processing cancer. In this case, the control circuit 71 extracts pattern shapes A to C, colors of pattern shapes A to C affixed to the object S, and the like. Based on data of the extracted pattern shapes A to C, colors and the like, the control circuit 71 controls the display 9a and generates cutting or printing data of the pattern shapes.

Figure 6:
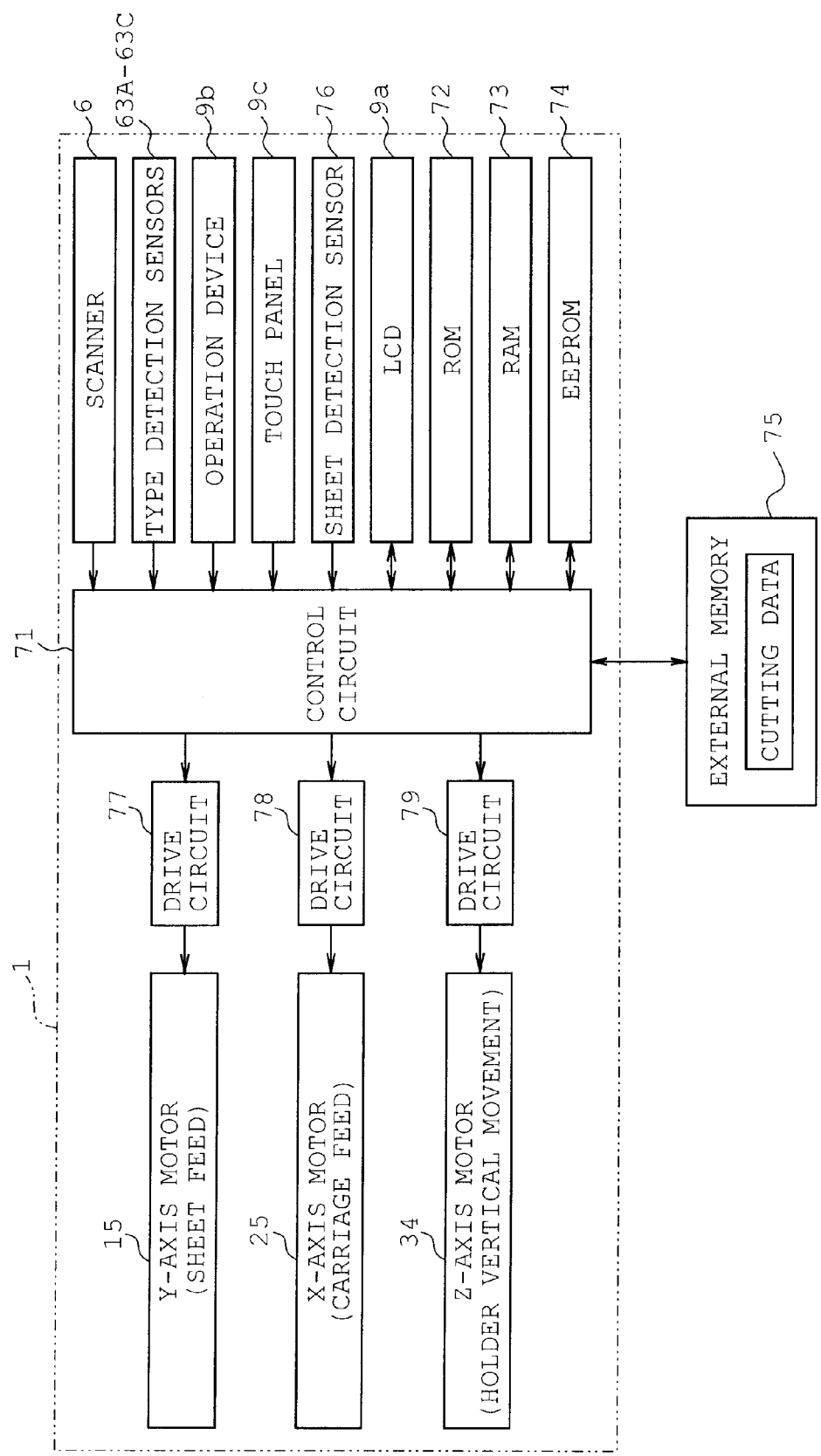
FIG. 6 is an example of a schematic block diagram showing an electrical configuration of the apparatus.

The control system of the processing apparatus 1 will be described with reference to FIG. 6. The control circuit 71 is an example of a processor controlling the entire processing apparatus 1. The control circuit 71 is mainly configured of a computer (CPU). The computer may be an example of a processor. The CPU (Central Processing Unit) may be also an example of a processor. The control circuit 71 is connected to a ROM 72, a RAM 73, an EEPROM 74 and an external memory 75. The ROM 72 stores a cutting control program, a printing control program, a display control program. The cutting control program is provided for controlling a cutting operation. The printing control program is provided for controlling a printing operation. The display control program is provided for a displaying operation of the display 9a. The ROM 72 further stores a data processing program. The data processing program includes a cutting data generation program provided for generating cutting data based, a printing data generation program provided for generating printing data. The external memory 75 stores the cutting data and the printing data. The cutting data is provided for cutting a plurality of types of pattern shapes. The printing data is provided, for printing a plurality of types of pattern shapes.

Signals are supplied, to the control circuit 71 from the sheet detection sensor 76, the type detection sensors 63A to 63C, the scanner 6 and the like. To the control circuit 71 are connected the display 9a, the touch panel 9c and various operation switches of the operation, device 9b. While viewing a display screen of the display 9a, the user operates various switches of the operation device 9b or the touch panel 9c. As a result, the user can select a desired pattern and set various processing modes and parameters. To the control circuit 71 are further connected drive circuits 77, 78 and 79 driving the Y-axis motor 15, the X-axis motor 25 and the Z-axis motor 34, and the like. Based on the cutting or printing data, the control circuit 71 controls the Y-axis motor 15, the X-axis motor 25, the Z-axis motor 34 and the like so that a cutting or printing operation is automatically executed for the object S on the holding sheet 10. Thus, the control circuit 71 constitutes a processing unit together with the cutting unit and the printing unit.

The control circuit 71 of the example constitutes a processing data generation unit which generates the cutting data and the printing data based on the image data. The cutting data and the printing data will be collectively called, "processing data" hereinafter. Additionally, the cutting operation and the printing operation both controlled by the control circuit 71 will be collectively called "processing operation" hereinafter.

The cutting data will be described with an exemplified case where pattern shapes printed on the object S are cut. More specifically, the object S is a piece or paper on which are printed a pattern A of "square," a pattern B of "heart" and a pattern C of "circle." The paper is an object to be read and to be cut. Image data of the object S is obtained by the above-described scanner 6. Furthermore, data indicative of outlines of the pattern shapes A to C is generated on the basis of the image data.

Figure 8:
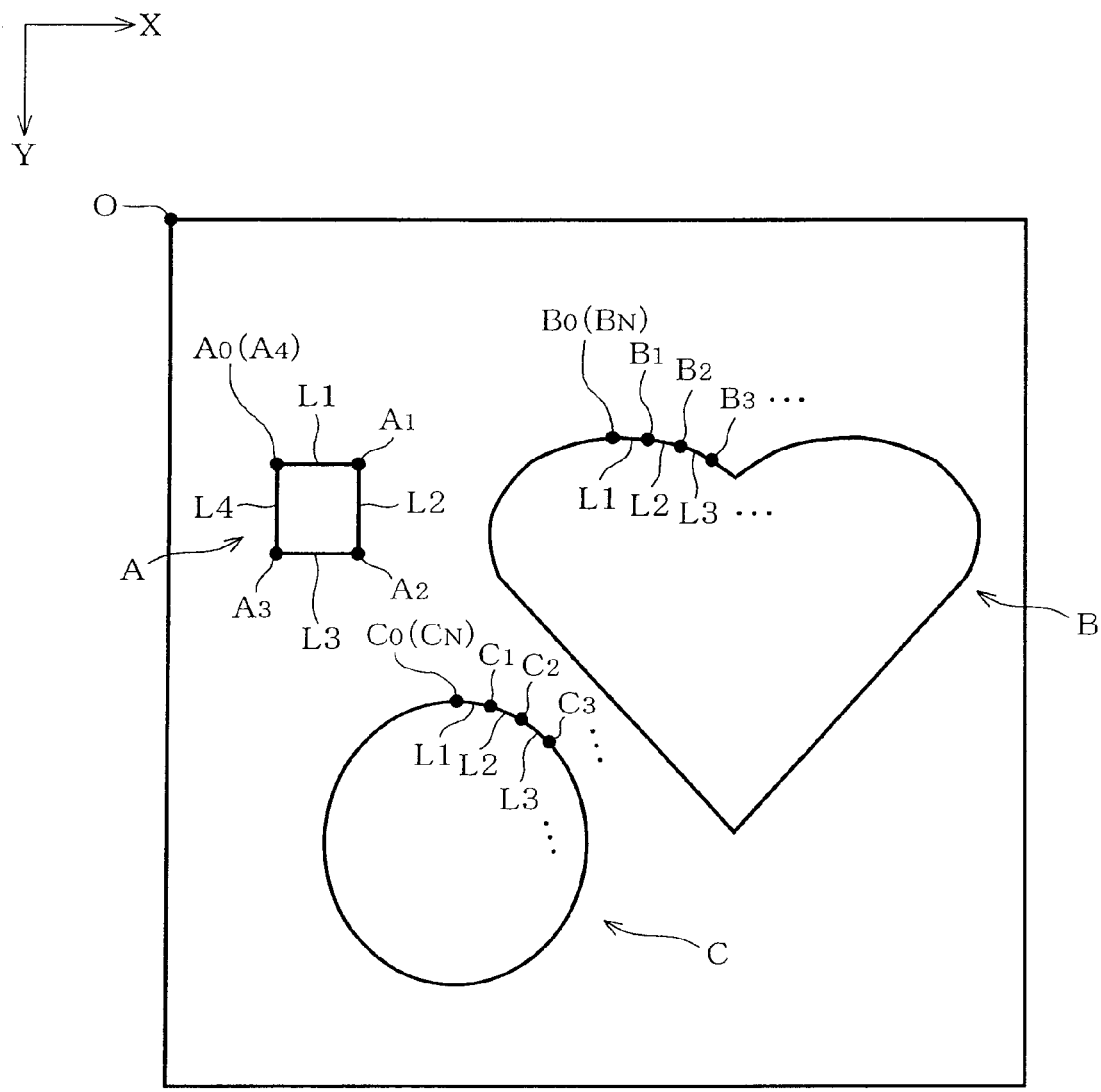
FIG. 8 illustrates an example of a pattern to which processing is applied based on processing data.

More specifically, as shown in FIG. 8, data of coordinate values of apexes $A_0$, $A_1$, $A_2$ and $A_3$ is extracted from line segments composing an outline of the pattern A. The apexes $A_0$ to $A_3$ include one in which X and Y coordinates are minimum (upper left side in FIG. 8). Furthermore, the outline of the pattern A includes an arc-shaped portion, which is divided at predetermined intervals, so that coordinate values of the apexes are calculated. Thus, cutting line data is generated which is used to fern a cutting line composed of line segments L1, L2, L3 and . . . connecting among the cutting start point $A_0$, apex $A_1$, apex $A_2$, and cutting end point $A_N$. The cutting line data of the pattern h has first coordinate data, second, coordinate data, third coordinate data, fourth coordinate data and fifth coordinate data corresponding to the cutting start point $A_0$, apex $A_1$, apex $A_2$, apex $A_3$ and cutting end point $A_N$, respectively (see FIG. 7).

Regarding line segments composing an outline of pattern B, too, data of coordinate values of apexes $B_0$, $B_1$, $B_2$, . . . is extracted from line segments composing an outline of the pattern B. For example, the left upper side in FIG. 8 is set as a cutting start point $B_0$ and a cutting end point $B_n$. An outline of pattern B includes an arc part which is divided at predetermined intervals, and coordinate values of apexes are computed. Thus, cutting line data of the pattern of "heart" is generated, with respect to the pattern B. The pattern of "heart" is composed of line segments L1, L2, L3 and L4 connecting among the cutting start point $B_0$, apex $B_1$, apex $B_2$, . . . and cutting end point $B_n$. The cutting line data of the pattern B includes first to (N+1-th coordinate data corresponding to the cutting start point $B_0$, apexes $B_1$, $B_2$ to (N+1)-th coordinate data respectively (see FIG. 7).

Regarding line segments composing an outline of the pattern C, too, a cutting start point $C_0$ and a cutting end point $C_n$ are set in the same manner as the pattern B. An outline of pattern C includes a circumference which is divided at predetermined intervals, and coordinate values of apexes $C_0$ . . . are computed. As a result, the cutting line data is generated which forms a cutting line of the "circle" composed of line segments L1, L2, L3, . . . connecting a cutting start point $C_0$, apex $C_1$, apex $C_2$, and cutting end point $C_n$. The cutting line data of the pattern C has first coordinate data, second coordinate data, third coordinate data, . . . (N+1)-th coordinate data corresponding to the cutting start point $C_0$, apex $C_1$, apex $C_2$, . . . and cutting end point $C_n$, respectively (see FIG. 7).

FIG. 7 is a conceptual diagram showing cutting data (full data) of the pattern shapes A to C. The cutting data includes delimiter data suffixed, to the cutting line data of the pattern shapes A to C. The cutting data also includes data of number of pattern shapes and display data. The number of pattern shapes is a total number of pattern shapes A to C (three in this case).

The control circuit 71 causes the apparatus to execute a cutting operation to cut the pattern shapes A, B and C sequentially in this order, based on the above-described cutting data. Here specifically, firstly, the cutter 44 is relatively moved to the X-Y coordinates of the cutting start point $A_0$ by the transfer mechanism 7 and the head moving mechanism 8. The blade edge 46 of the cutter 44 is then caused to penetrate through the cutting start point $A_0$ part of the object S by the up-down drive mechanism 33. In this state, the blade edge 46 is relatively moved by the transfer mechanism 7 and the head moving mechanism 8 so as to connect linearly among the apexes $A_1, A_2, A_3$ . . . sequentially. Thus, the line segments L1, L2, L3 and L4 are cut sequentially continuously with the result that the outline of the pattern α of "square" is cut out.

The other pattern shapes B and C are also cut out based on the cutting line data in the same manner as described above. Furthermore, based on the delimiter data suffixed to each cutting line data, the blade edge 46 of the cutter 44 is departed from the object S by the up-down drive mechanism 33 every time the cutting of cutting line is finished.

The printing data will be described in the same manner as described with an exemplified case where the pattern shapes A to C on the object S are printed. The printing data includes data of the number of pattern shapes, printing line data, color data, delimiter data and display data.

The printing line data of the pattern shapes A to C is generated on the basis of the same image data of the object S as in the same manner as the above-described cutting line data. Accordingly, coordinate data is generated which corresponds to the printing and the cutting on the basis of coordinate values of the apexes of the pattern shapes A to C extracted frost the image data. As a result, printing line data of the pattern A has coordinate data including the start and end points of the line segments L1 to L4 shown in FIG. 8, which points are represented as X-Y coordinates. Printing line data of the pattern shapes B and C also has coordinate data including the start and end points of the line segments L1 . . . , which points are represented as X-Y coordinates. The color data includes color information (RGB values, for example) of the pattern shapes A to C obtained from the image data. A type of the color of the pen 45 is specified by the color information. The color data is set for every one of the pattern shapes A to C so as to correspond to the printing line data.

In the printing, the cartridge 4p of the pen 45 of the relevant type is displayed on the display 9a on the basis of the color data. The user attaches the cartridge 4p to the cartridge holder 32 while viewing displayed contents on the display 9a. The control circuit 71 executes the above-described printing operation and relatively moves the pen 45 based on the printing line data, whereby the line segments L1 . . . are plotted sequentially in this order. As a result, the pattern shapes A, B and C are printed along the outlines of the pattern shapes A to C of the object S respectively. Delimiter data is suffixed to the printing line data of the pattern shapes A to C respectively. The pen tip 48 is departed from the object S by the up-down drive mechanism 33 every time the plotting of the pattern shapes A to C is completed on the basis of the delimiter data.

Thus, in the processing apparatus 1, processing data is generated from the image data of the pattern shapes A to C or the object S. The processing is executed on the basis of the generated processing data, with the result that the object S can be cut or printed.

Figure 10:
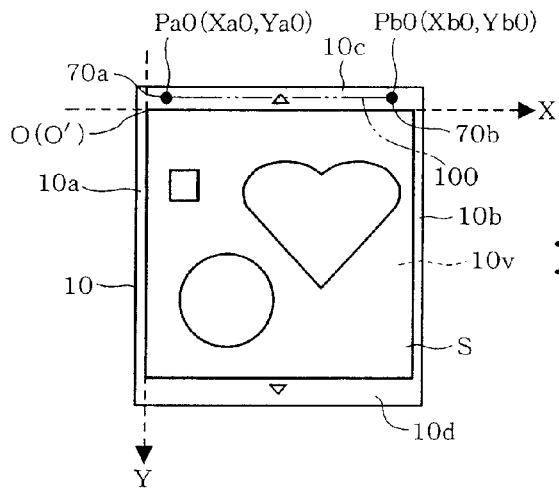
FIG. 10 illustrates an example of a read screen in a first mode.

An orthogonal coordinate system is defined in the holding sheet 10 as shown in FIG. 10. This coordinate system has an original O which is the left corner part of the adhesive layer 10v serving as a cuttable area. The coordinate system has a lateral direction extending along a distal end side edge 10c of the holding sheet 10 and a longitudinal direction extending along a left side edge 10a of the holding sheet 10. On the other hand, the holding sheet 10 is set at a reference set position in the processing apparatus 1. In this case, an X-Y coordinate system is set in the processing apparatus 1 on the basis of the origin O of the holding sheet 10. The holding sheet 10 (the object S) and the processing head 5 are moved relative to each other based on the X-Y coordinate system.

The reference set position refers to a set state of the holding sheet 10, in which both sides 10a and 10b of the holding sheet 10 extend along the Y direction and the holding sheet 10 is held between the driving roller 12 and the pinch roller 13 so that the holding sheet 10 is not displaced from the driving roller 12 and the pinch roller 13 at least in the X direction. Accordingly, the orthogonal coordinate system of the holding sheet 10 corresponds with the X-Y coordinate system (see origin O' in FIG. 11A) of the processing apparatus 1 when the holding sheet 10 set on the processing apparatus 1 is located at the reference set position.

Figure 11A:
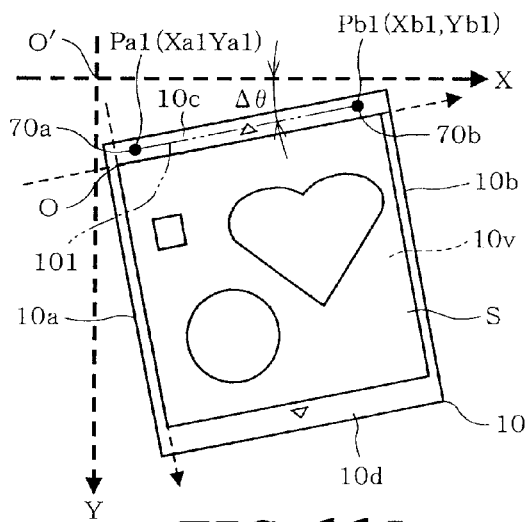
FIGS. 11A, 11B and 11C illustrate coordinate data conversion during generation of processing data.

On the other hand, as shown in an exaggerated manner in FIG. 11A, the holding sheet 10 is sometimes displaced from the reference set position relative to the processing apparatus 1. More specifically, assume now that the holding sheet 10 is inclined relative to an orientation of the normally set holding sheet 10. In this case, the holding sheet 10 is held between the driving roller 12 and the pinch roller 13 to be transferred while being inclined. Accordingly, image data of the object S on the holding sheet 10, obtained by the scanner 6 and images of the pattern shapes A to C on the display 9a are also inclined accordingly thereby to be displaced, (see FIG. 11B). Furthermore, processing data of inclined pattern shapes A to c is generated based on the image data.

In view of the above-described problem, the holding sheet 10 is provided with, two markers 70a and 70b to specify a set position thereof on the processing apparatus 1. The markers 70b and 70a are small circular black marks and are located at right and left sides of the front edge of the holding sheet 10 respectively. The control circuit 71 specifies a set position of the holding sheet 10 currently set on the processing apparatus 1 by the use of a software configuration thereof (execution of a data processing program), based on image data of these markers 70a and 70b. The control circuit 71 then calculates an amount of deviation of the specified set position of the holding sheet 10 from a reference set position. Image data and processing data are compensated based on the deviation amount.

The above-described shape and color of the markers 70a and 70b should not be restrictive but may be changeable. The locations of the markers 70a and 70b may be also changed suitably. Furthermore, a part or whole of the contour (outline) may be a marker. Still furthermore, the marker may be a through hole formed in the front edge 10c of the holding sheet 10 or a cutout formed by cutting out a part of the contour of the holding sheet 10. On the other hand, the above-mentioned markers may be provided on the object S held on the holding sheet 10 instead of being provided on the holding sheet 10. Furthermore, a part or whole of the object S may be a marker. Additionally, when the object S has a pattern or design, the pattern or design may be a marker. In this case, the marker may be a part or whole of the pattern or design. The above-described markers serve as a reference to specify the position of the holding sheet 10 or the object 3 on the processing apparatus 1.

The aforementioned displacement amount is calculated from the difference between X-Y coordinates of center points $Pa_1$ and $Pb_1$ (see FIG. 11A) of images of the markers 70a and 70b indicated by the image data and X-Y coordinates of the original center points $Pa_0$ and $Pb_0$ (see FIG. 10) at the reference set position. For example, it is assumed that Y coordinates of the center points $Pa_1$ and $Pb_1$ do not correspond with each other ($Ya_1 \neq Yb_1$). In this case, an amount of displacement obtained by the calculation can be represented by angle $\Delta\theta$ as shown in FIG. 11A. On the other hand, it is assumed that Y coordinates of the center points $Pa_1$ and $Pb_1$ correspond with each other ($Ya_1 = Yb_1$). In this case, a displacement amount is represented by x-displacement $\Delta x$ and y-displacement $\Delta y$. Calculation of displacement amount will be described in detail later. Note that the data processing program may contain, as specified values, X-Y coordinates of the center points $Pa_0$ and $Pb_0$ at the reference set position.

Figure 9:
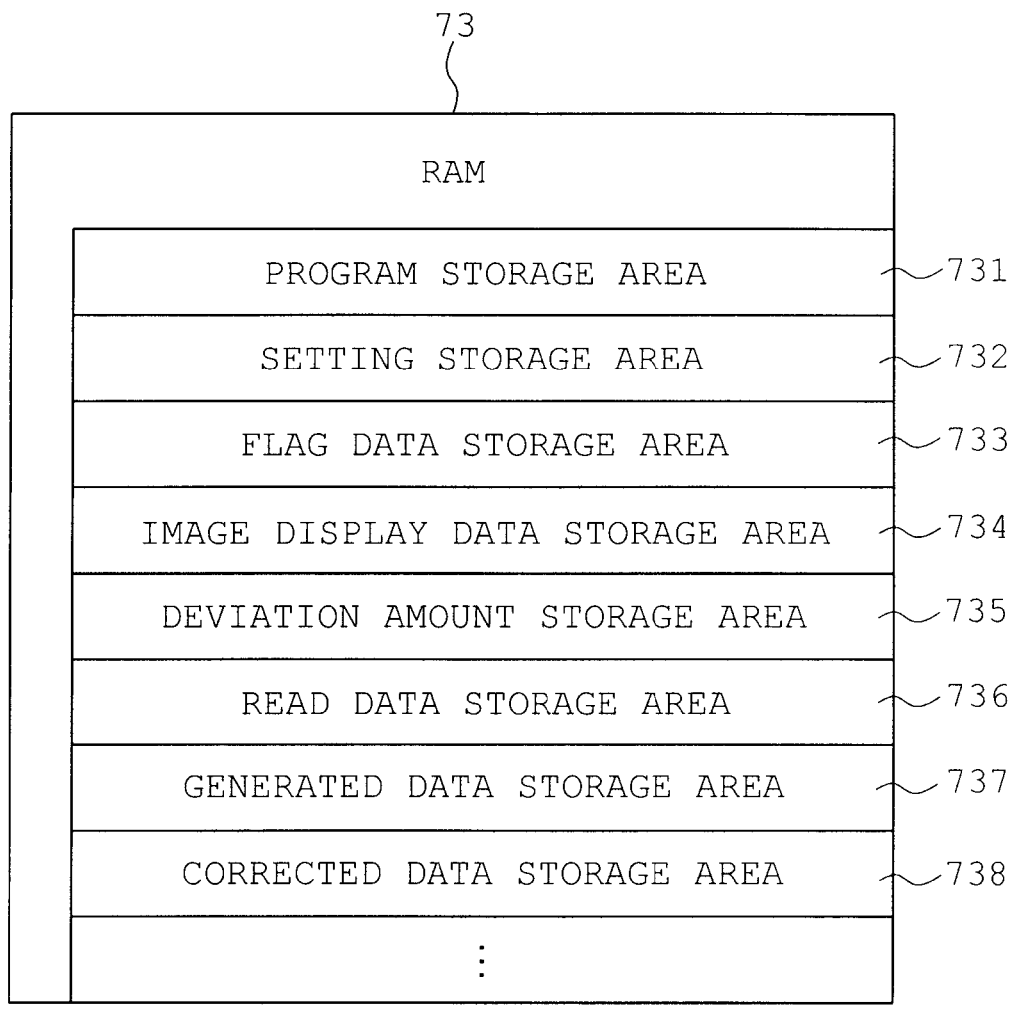
FIG. 9 illustrates an example of a mode switching screen.

The RAM 73 has a storage area to temporarily store various data. Date stored in the RAM 73 includes the above-described programs, processing data, the results of calculation by the control circuit 71 and the like. In more detail, as shown in FIG. 9, the RAM 73 has a plurality of storage areas including a program storage area 731, a setting storage area 732, a flag data storage area 733, an image display data storage area 734, a displacement amount data storage area 735, a read data storage area 736, a generated data storage area 737 and a corrected data storage area 738. The program storage area 731 stores various programs read from the ROM 72 and the like. The setting storage area 732 stores set values, tables and the like all of which are referred to in the execution of the programs. The flag data storage area 733 stores various flags used in execution of the program.

The image display data storage area 734 stores image data of screens displayed on the display 9a and display setting. The displacement amount storage area 735 stores data of displacement amount used in the correction of the image data and processing data. The read data storage area 736 stores cutting data and printing data in the case where processing is executed on the basis of generated processing data. The generated data storage area 737 stores cutting data and printing data both generated on the basis of image data. The corrected data storage area 738 stores cutting data and printing data both corrected on the basis of the displacement amount.

The operation of the above-described construction will be described with reference to FIGS. 14 to 17. The flowcharts of FIGS. 14 to 17 show a sequence of processing of the data processing program executed by the control circuit 71 and processing. A scan and processing mode and a processing mode will now be described. The scan and processing mode is executed to process the object S affixed with a pattern. The processing mode executes processing on the basis of processing data.

Firstly, the user causes the display 9a to display a setting screen (a processing mode selecting screen). The user further touches the touch panel 9c to select the processing mode (step S1). When the scan and processing mode is selected, the user affixes the object S with the pattern shapes A to C to the holding sheet 10. The holding sheet 10 is set on the processing apparatus 1 so as to extend in the direction of arrow in FIG. 1 (step S2). On the other hand, when the processing mode is selected, the user affixes the object to be processed (plain paper (not shown), for example). The holding sheet 10 is also set on the processing apparatus 1 in the direction of arrow in FIG. 1.

The position of the holding sheet 10 set on the processing apparatus 1 in the above-described case is referred to as "first set position." For example, when the holding sheet 10 located at the first set position is held between the driving roller 12 and the pinch roller 13 while being inclined relative to the driving roller 12 and the pinch roller 13, the image of the object S is displaced as described above with the result that processing data to be generated would be adversely affected. In view of this problem, a displacement amount calculating process is executed at step S3 (see FIG. 15).

In the displacement amount calculating process, the control circuit 71 causes the detection sensor 76 to detect the setting of the holding sheet 10. The control circuit 71 then drives both rollers 12 and 13 of the transfer mechanism 7, so that the holding sheet 10 is transferred to the location where the markers 70a and 70b are read (step S21). More specifically, the holding sheet 10 is transferred to the position where the distal end 10c thereof is located below the scanner 6.

Image data of the markers 70a and 70b parts is obtained by the scanner 6 (step S22). The control circuit 71 further processes the obtained image data of the markers 70a and 70b in a known image processing manner. X-Y coordinates of the center point or the images of the markers 70a and 70b represented by the image data is obtained (see FIG. 11A). In this case, the control circuit 71 can extract X-Y coordinates of center points Pa1 and Pb1 according to an algorithm of the Hough transform. Algorithm known in image processing library such as Open CV can be employed as the Hough transform. The control circuit 71 then calculates a displacement amount (step S24). The displacement amount is calculated based on X-Y coordinates of the center points $Pa_1$ and $Pb_1$ extracted from the image data and X-Y coordinates of the original center points $Pa_0$ and $Pb_0$ at the reference set position.

More specifically, assume now that the control circuit 71 determines that Y coordinates of the center points $Pa_1$ and $Pb_1$ do not correspond with each other ($Ya_1 \neq Yb_1$; and see FIG. 11A). In this case, the control circuit 71 calculates a displacement amount represented by $\Delta\theta$. In this regard, as shown in FIG. 10, Y coordinate of the center point $Pa_0$ of the marker 70a and Y coordinate of the center point $Pb_0$ at the reference set position correspond, with each other ($Ya_1 = Yb_1$). Accordingly, an angle $\Delta\theta$ is made by an imaginary line segment 101 connecting between the center points $Pa_1$ and $Pb_1$ and an imaginary line segment 100 connecting between the center points $Pa_0$ and $Pb_0$ at the reference set position. The angle $\Delta\theta$ is calculated from the following equations (1) and (2):

$$\sin \Delta\theta = (Yb_1 - Ya_1)/[(Xb_1 - Xa_1)^2 + (Yb_1 - Ya_1)^2]^{1/2} \quad (1)$$

$$\cos \Delta\theta = (Xb_1 - Xa_1)/[(Xb_1 - Xa_1)^2 + (Yb_1 - Ya_1)^2]^{1/2} \quad (2)$$

The control circuit 71 causes the RAM 73 to store sin $\Delta\theta$ and cos $\Delta\theta$ in the displacement amount storage area 735 thereof. The sin $\Delta\theta$ and cos $\Delta\theta$ are used as converted values in an affine transform in which a coordinate point and an image are rotated about the origin O by $\Delta\theta$.

Figure 13A:
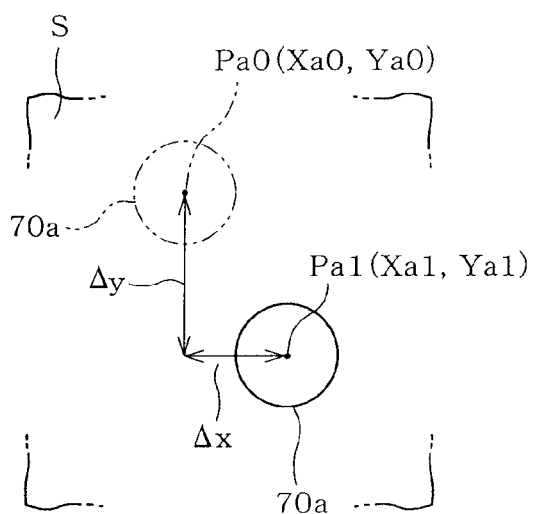
FIGS. 13A and 13B are enlarged, views showing x-difference Δx and y-difference Δy between a first, set position and a reference set position.
Figure 13B:
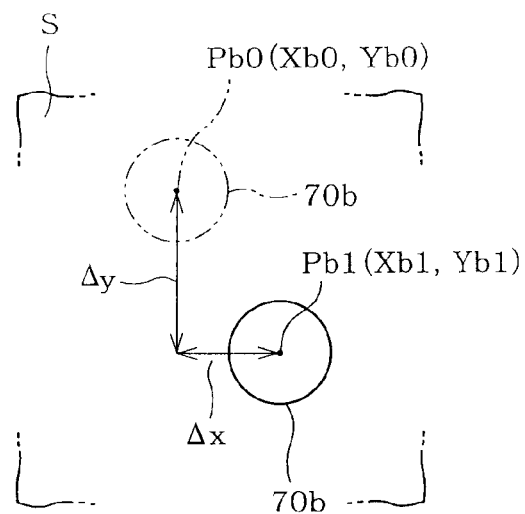
Figure 14:
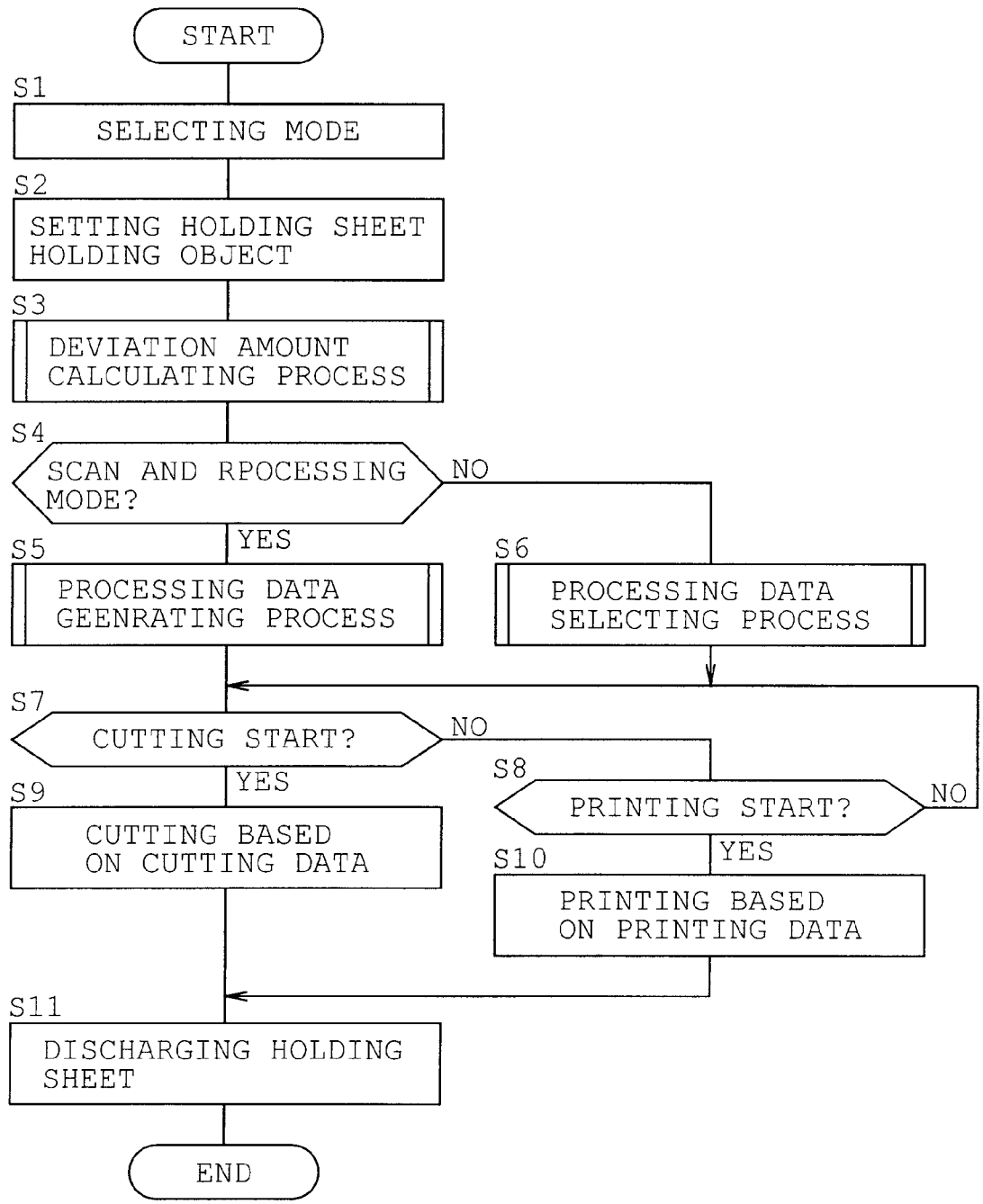
FIG. 14 illustrates an example of a flowchart showing an entire processing flow including the first and second modes.
Figure 15:
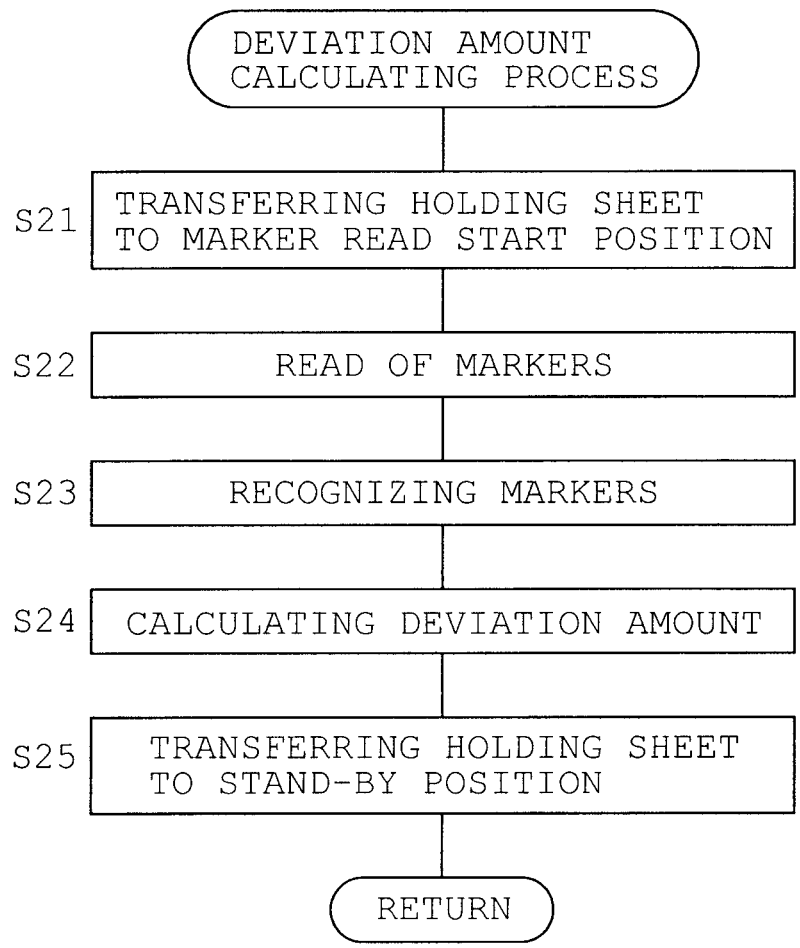
FIG. 15 is an example of a flow-chart showing a flow of processing data generating process.
Figure 16:
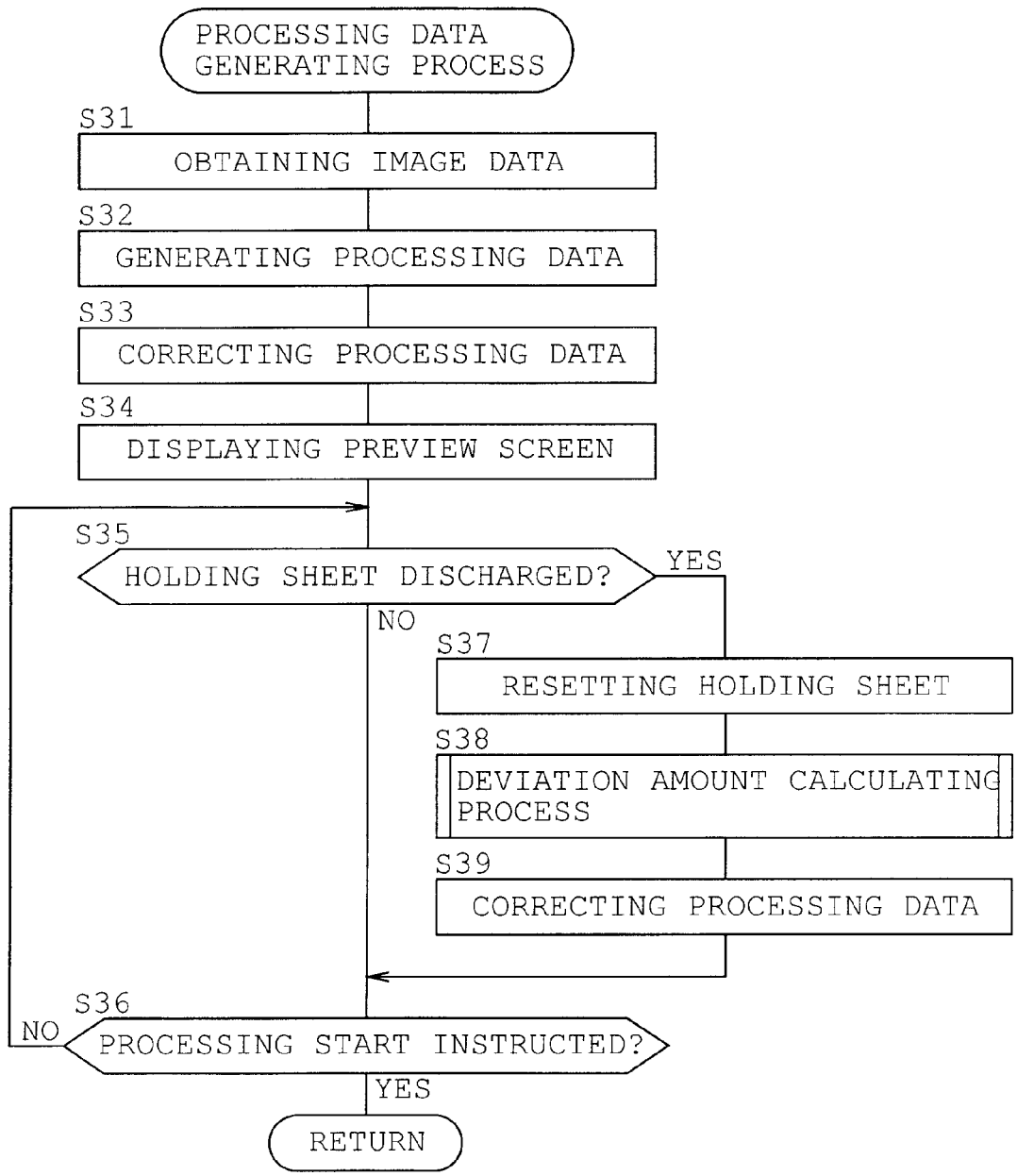
FIG. 16 is similar to FIG. 13, showing a second example.

Furthermore, assume that the control circuit 71 determines that the Y coordinates of the center points $Pa_1$ and $Pb_1$ extracted from the image data correspond with each other ($Ya_1 = Yb_1$). In this case, too, the control circuit 71 calculates x-displacement $\Delta x$ and y-displacement $\Delta y$ in order that the coordinate system of the holding sheet 10 and the coordinate system of the processing apparatus 1 (see origin O and origin O' in FIG. 11A) may correspond with each other. More specifically, the control circuit 71 obtains the x-difference $\Delta x$ and the y-difference $\Delta y$ between a coordinate ($Xa_1, Ya_1$) of the center point Pa1 based, on the image data as show in FIG. 13A and a coordinate ($Xa_0, Ya_0$) of the center point $Pa_0$ at the reference set position. These differences $\Delta x$ and $\Delta y$ are stored in the deviation amount data, storage area 735 and are used as transformed values in the affine transform in which a coordinate point and an image are translated.

The aforementioned affine transform is represented by the following equation (3) using transform matrix M:

$$(X', Y', 1) = M(X, Y, 1) \quad (3)$$

X and Y in equation (3) are coordinates before transform and X' and Y' are coordinates after transform. The transform matrix M is a known three-by-three matrix.

Upon completion of calculation, of deviation amount, the control, circuit 71 causes the transfer mechanism 7 to transfer the holding sheet 10 to a stand-by position (step S25). More specifically, since the read operation is continuously carried out, the holding sheet 10 is returned to a location where the distal end 10c thereof is below the scanner 6 by the transfer mechanism 7, whereby the control circuit 71 returns to step S4.

Assume that the control circuit 71 determines at step S4 that the scan and processing mode has been selected at step S1 (YES). In this case, the control circuit 71 proceeds to a processing data generating process at step S5 (see FIG. 16). IN the processing data generating process, the control circuit 71 obtains image data of the object S on the holding sheet 10 by the read operation of the scanner 6 (step S31). The control circuit 71 generates processing data based on the obtained image data (step S32).

More specifically, data of coordinate values of apex $A_0$, apex $A_1$, apex $A_2$, apex $A_3$ of line segments composing the outline of "square" are obtained from the image of object S (see FIG. 8). The control circuit 71 then generates cutting line data having first coordinate data, second coordinate data, third coordinate data, fourth coordinate data and fifth coordinate data corresponding to the cutting start point $A_0$, apex $A_1$, apex $A_2$, apex $A_3$ and cutting end point $A_4$ respectively (see FIG. 7). Furthermore, the control circuit 71 also extracts coordinate values of apexes $B_0, B_1, B_2 \ldots$ of "heart" and coordinate values of apexes $C_0, C_1, C_2 \ldots$. The control circuit 71 then generates cutting line data having first coordinate data to (N+1)-th coordinate data of the pattern shapes B and C. The control circuit 71 further adds delimiter data to the end of each cutting line data and further adds display data to each cutting line data, thereby generating cutting data of pattern shapes A to C.

Furthermore, the control circuit 71 generates coordinate data represented by X-Y coordinates of the apexes of printing line data of "square," "heart" and "circle." The control circuit 71 adds delimiter data to the end of each printing line data and adds color data and display data, thereby generating printing data of the pattern shapes A to C. The generated cutting data and printing data are stored in the generated data storage area 737. The cutting data and printing data correspond to processing data at the location of the currently set holding sheet 10, namely, the first, set position.

Figure 11B:
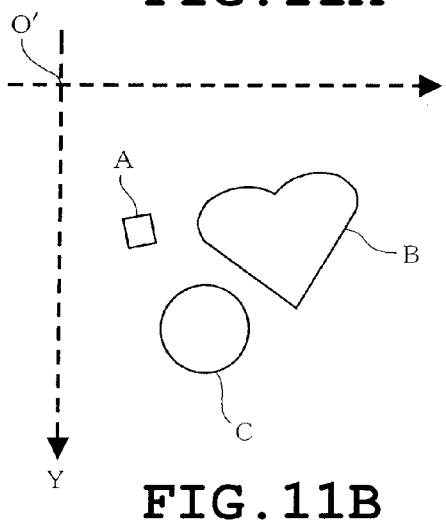
Figure 11C:
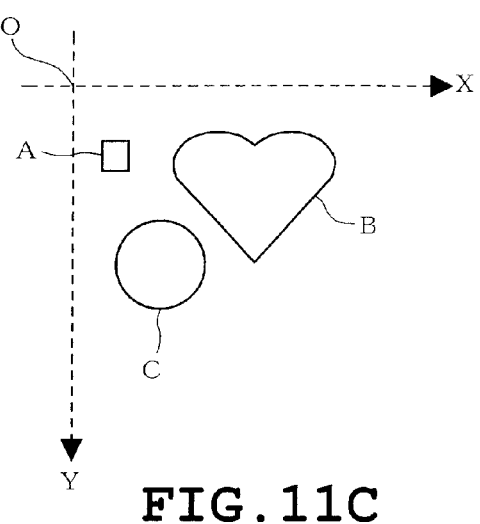

Assume now that the holding sheet 10 at the first set position is located at the reference set position and has no deviation amount in the generated processing data (see FIG. 11C). In this case, the processing data has been considered to be corrected into (standard) processing data also suitable for Either objects (step S33). Additionally, the processing data in this case can be stored in the corrected data storage area 738 and another non-volatile storage unit.

On the other hand, assume now that the holding sheet 10 at the first set position is deviated from the reference set position, as shown in FIG. 11A. Accordingly, further assume that coordinate data corresponding to a processing line as shown in FIG. 11B are obtained regarding processing data of the patters A to C. In this case, at step S33, the control circuit 71 corrects processing data (affine transform) using deviation amounts sin $\Delta\theta$, cos $\Delta\theta$, $\Delta x$ and $\Delta y$ calculated at step S24. In this case, coordinate data corresponding to the apexes of "square," "hear" and "circle" are transformed to values obtained by rotating the coordinate points about the origin O by $\Delta\theta$ and farther transformed into values obtained by translating by $\Delta x$ in the X direction and by $\Delta y$ in the Y direction. As a result, corrected data converted into values of the coordinate system of the holding sheet 10 as shown in FIG. 19 is generated from coordinate data indicative of orientations of the pattern shapes A to C and processing position before correction in FIG. 11B (see FIG. 11C). Generated corrected data is stored in the corrected data storage area 738.

The control circuit 71 then causes the display 9a to display preview screens of the pattern shapes A to C with a suitable on a suitable scale (step S34). The pattern shapes A to C on the preview screen can be represented by a display coordinate system corresponding to the coordinate system of the holding sheet 10 as shown in FIG. 10 on the basis of the corrected data (see FIG. 11C). On the preview screen, an affine transform may be carried out for the image data obtained at step S31 using the deviation amount, and the pattern shapes A to C may be displayed, based on the corrected image data.

Subsequently, when instruction to start processing is supplied to the control circuit 71 with the use of the switches of the operation device 9b and the touch panel 9c (NO at step S35 and YES at step S36), a processing operation is executed based on the processing data before correction. More specifically, the processing operation is executed in response to the instruction to start the processing unless the holding sheet is discharged, by erroneous operation of the switches of the operation device 9b and the touch panel 9c (return to step S7 in FIG. 14).

In this case, the holding sheet 10 located at the first set position is cut or printed on the basis of processing data stored in the generated data storage area 737 (steps S7 to S10). As a result, the pattern shapes A to C attached to the object S can be cut out by the cutter 44 or the pattern shapes A to C can be drawn by the pen 45. Procedures of the cutting process and printing process will be described later.

Figure 12A:
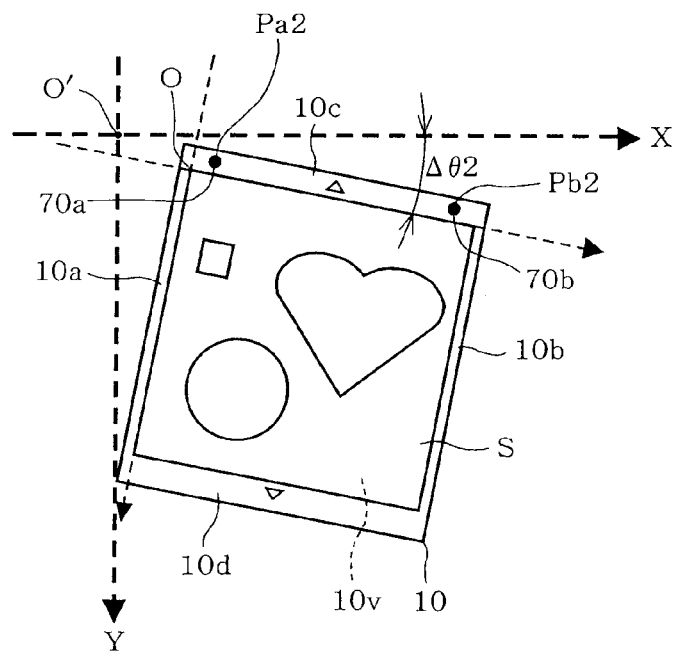
FIGS. 12A, 12B and 12C illustrate coordinate data conversion during processing.

On the other hand, when the holding sheet 10 has been discharged for certain operational reason (YES at step S35), the holding sheet 10 needs to be set again (step S37). A position of the holding sheet 10 set again is referred to as "second set position." The second set position is deviated from the reference set position and differs from the first set position as shown in an exaggerated manner in FIG. 12A.

Figure 12B:
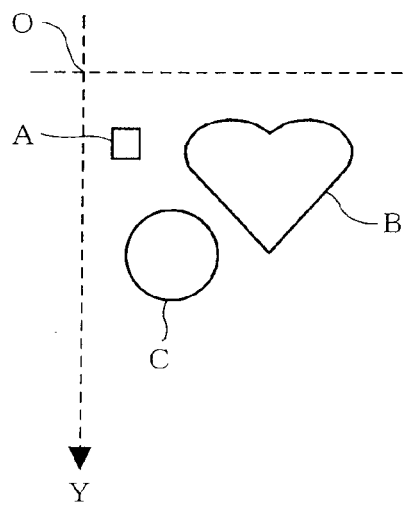
Figure 12C:
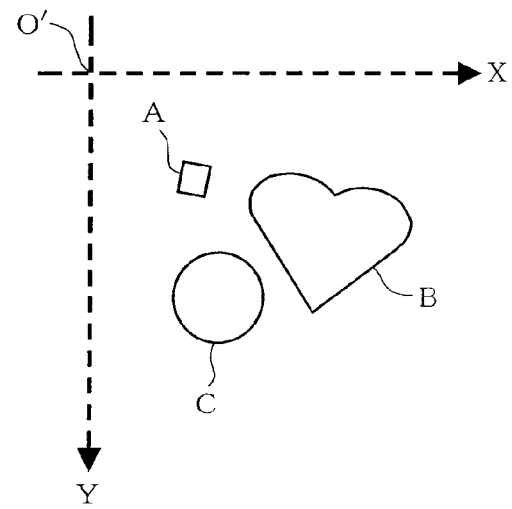

The same processing as the deviation amount calculation process at step S3 is executed for the holding sheet 10 located at the second set position, at step S38. As a result, image data of the markers 70a and 70b of the holding sheet 10 is obtained again. A deviation amount of the holding sheet 10 is calculated based on the X-Y' coordinates of the center points $Pa_2$ and $Pb_2$ of the markers 70a and 70b extracted from the image data and the X-Y coordinates of the center points $Pa_0$ and $Pb_0$ located at the reference set position. The calculated deviation amount is represented by $\sin \Delta\theta2$, $\cos \Delta\theta2$, $\Delta x2$ and $\Delta y2$. These values represent an amount of deviation of holding sheet 10 at the second set position relative to the reference set position. Then, an affine transform is carried out for the coordinate data of the processing data stored in the corrected data storage area 738 using $\sin \Delta\theta2$, $\cos \Delta\theta2$, $\Delta x2$ and $\Delta y2$ representing the deviation amount at the second set position (step S33). In this case, coordinate data indicative of the pattern shapes A to C in FIG. 12B is transformed to values obtained by rotating the coordinate points about the origin O by $\Delta\theta2$ and further transformed to values obtained by translating by $\Delta x2$ in the X direction and by $\Delta y2$ in the Y direction. Consequently, corrected data is generated and is indicative of the orientations and processing positions of the pattern shapes A to C according to the second set position of the holding sheet 10.

Thus, even when the holding sheet 10 is discharged before start of processing (YES at step S35), the corrected data is generated according to the second set position of the holding sheet 10 set again (steps S37 to S39). As a result, in response to the instruction to start processing (YES at step S36), processing can be executed along the pattern shapes A to C of the object S (return to step S7 in FIG. 14). In this case, the control circuit 71 determines whether or not the cartridge 4 corresponding to cutting or printing of the pattern shapes A to C has been attached, based on detection signals of the type detection sensors 63A to 63C and the corrected data. When determining that the corresponding cartridge 4 is not attached, the control circuit 71 causes the display 9a to display an indication. The user then attaches a corresponding cartridge 4 to the cartridge holder 32 and the lever member 40 is switched from the open position to the fixed position thereby to fix the cartridge 4 (see FIG. 5).

In this case, the control circuit 71 identifies the type of the cartridge 4 based on the detection signals of the type detection sensors 63A to 63C. When the instruction to start processing indicates start of cutting (YES at step S7), the control circuit 71 executes a cutting operation based on the cutting data as the corrected data (step S9). Accordingly, even when the holding sheet 10 set again is net located at the set position, the pattern shapes A to C attached to the object S can be cut with high accuracy without deviation with the result that the pattern shapes A to C can accurately be cut out. High precision printing can be executed (step S10) even in the case of instruction to start printing (YES at step S8), based on the printing data as the corrected data with the result that the pattern shapes can be accurately drawn therealong by the pen 45. Upon completion of cutting or printing of the pattern shapes A to C relative to the object S, the holding sheet 10 is transferred forward by the transfer mechanism 7 thereby to be discharged. As a result, the holding sheet 10 turns to the non-set state (step S11), completing the process (END).

Figure 17:
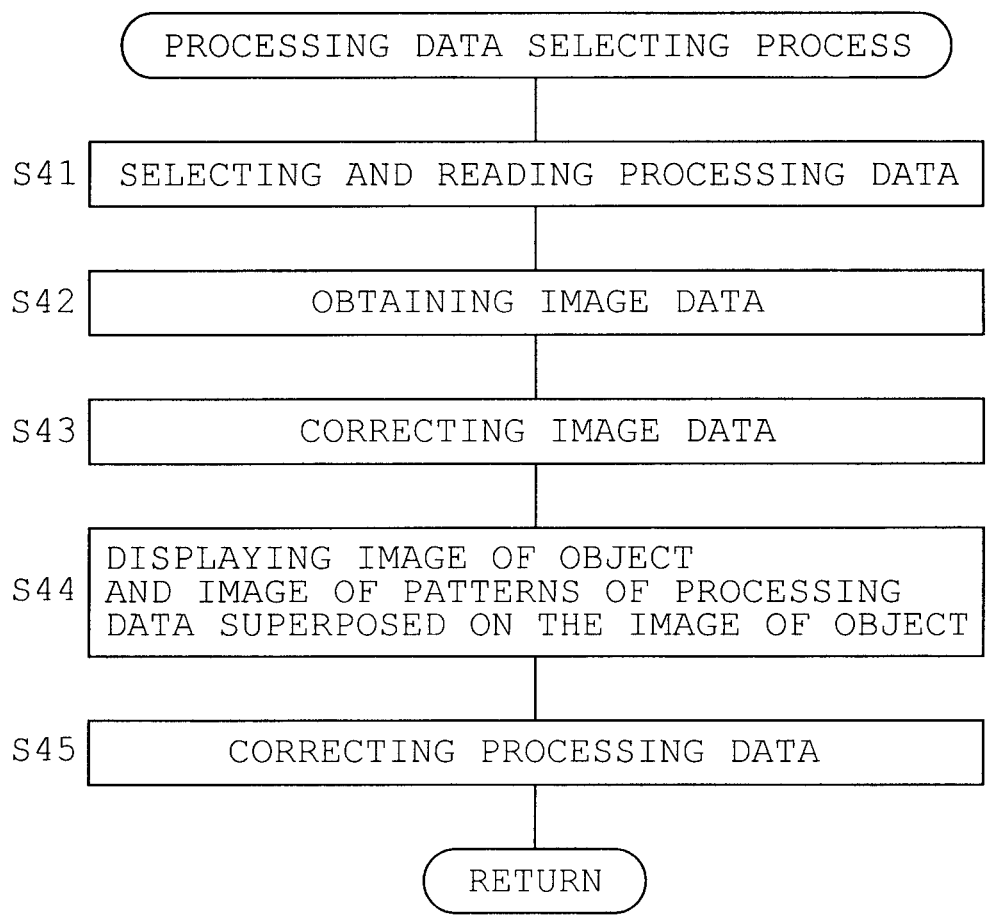
FIG. 17 is a flowchart showing processing data selecting process.

Subsequently, the processing data selecting process at step S6 will be described with reference to FIG. 17. The processing data selecting process is executed when the processing mode is selected at step S1. In the processing data selecting process, a pattern selecting screen (not shown) is displayed on the display 9a. The user touches a desired pattern shape on the touch panel 9c (step S41). Processing data of the selected pattern shape is read out from the external memory 75 thereby to be expanded to the read data storing area. The control circuit 71 causes the scanner 6 to execute the read operation thereby to obtain image data of the object (not shown). In this case, even if the image of the object to be obtained is an image of plain paper, there is a case of occurrence of deviation as described above (see FIG. 11A). The control circuit 71 then carries out an affine transform of the obtained image data using the deviation amounts $\sin \Delta\theta$, $\cos \Delta\theta$, $\Delta x$ and $\Delta y$ obtained at step S3 (step S43). The image data is rotated about origin O and translated in the X direction and the Y direction thereby to be corrected into an image of the object. The corrected mage is this stored in the image display data storage area 734. Furthermore, the control circuit 71 generates synthesized image data based on the corrected image data and the processing data of read pattern shape. The synthesized image data is representative of an image obtained by superposing the pattern shape on the corrected image of object at a processing position represented by the processing data. As a result, a preview screen (not shown) is displayed on the display 9a based on the generated synthetic image data (step S44). The image of the object and the selected pattern shape superposed on the object is displayed on a suitable scale on the preview screen. The object and the pattern shape on the preview screen can be represented by the display coordinate system corresponding to the coordinate system of the holding sheet 10 (the reference set position) in FIG. 10.

On the other hand, the control circuit 71 carries out an at fine transform of the processing data of the selected pattern shape (step S45). The affine transform is carried out in order that a process position of the selected pattern shape may correspond with an actual position (first set position) of the holding sheet 10. In this case, an affine transform of coordinate data of the processing data can be carried out using the deviation amount calculated at step S3. As a result, the original processing data (see FIG. 11C) defined by the coordinate system of the holding sheet 10 is corrected into coordinate data indicative of the orientation and the processed position of a pattern shape according to the deviation amount from the reference set position of the holding sheet 10 on the processing apparatus 1 (see FIG. 11B). The processing data (corrected data) is stored in the corrected data storage area 738. The control circuit 71 then returns to step S7 in FIG. 14.

Subsequently, when receiving the instruction to start cutting (YES at step S7), the control circuit 71 executing cutting based on the cutting data as the corrected data (step S9), whereby the pattern shapes of the object can be cut according to the orientation and position of the holding sheet 10 on the processing apparatus 1. Furthermore, even when "printing" is instructed. (YES at step S8), the control, circuit 71 can execute printing according to the orientation and position of the holding sheet 10 based on the printing data serving as the corrected data (step S10). Thus, when the cutting or printing of the pattern shapes relative to the object is completed, the holding sheet 10 is transferred forward by the transfer mechanists 7 so as to be turned to the non-set state (step S11), whereby the processing is completed (END).

The control circuit 71 serves as a calculation unit and a correction unit. The control circuit 71 calculates the deviation amount between the first set position where the holding sheet 10 is set on the processing device and the reference set position of the processing apparatus 1. The control circuit 71 corrects at least the image data based on the calculated deviation amount.

According to the above-described configuration, the deviation amount of the holding sheet 10 set on the processing apparatus 1 relative to the reference set position is calculated based on the image data of the markers 70a and 70b of the holding sheet 10 or the object. Even when the holding sheet 10 set on the processing apparatus 1 is located at the first set position deviated from the reference set position, the image data is corrected by the correction unit based on the calculated deviation amount with the result that image data without deviation can be achieved. Thus, when the holding sheet 10 is set on the processing apparatus 1, the deviation from the reference set position is allowed. Accordingly, the user need not worry about the deviation of the set position of the holding sheet 10 and can easily operate the processing apparatus 1.

The control circuit 71 constitutes processing data generation unit which generates the processing data for the processing unit to apply processing along the pattern shapes A to C of the object S based on the image data obtained by the image obtaining unit. The correction unit corrects the processing data generated by the processing data generation unit.

According to the foregoing configuration, the processing data is corrected by the correction unit even when the holding sheet 10 set on the processing apparatus 1 is not located at the reference set position. Accordingly, the same processing date as obtained when the holding sheet 10 is located at the reference set position can also be obtained even when the holding sheet is not located at the reference set position.

When the holding sheet 10 is set on the processing apparatus 1 again after having detached from the processing apparatus, the image obtaining unit, obtains the image data of the markers 70a and 70b re-obtained by the image obtaining unit. The correction unit generates correction data obtained by correcting the processing data read from the storage unit, based on the image data of the markers 70a and 70b re-obtained by the image obtaining unit. The processing unit applies processing along the pattern shapes A to C of the object 3 on the re-set holding sheet 10 located at the second position based on the correction data. Accordingly, even when the holding sheet is set again, the corrected data can be easily generated without obtaining the image data of the whole holding sheet.

The processing apparatus 1 includes the display unit which displays the image data corrected by the correction unit and the processing data superposed on the image data. Consequently, an accurate image without deviation can be displayed by the display unit based on the corrected image data and processing data.

The processing data includes coordinate data indicative of a processing position and/or orientation of the pattern shapes relative to the object. Based on the image data of the markers 70a and 70b, the correction unit transforms the coordinate data of the processing data into the values of the coordinate system on the holding sheet 10 with the markers 70a and 70b serving as references, thereby generating corrected data including corrected processing positions and/or orientations of the pattern shapes. According to this configuration, the coordinate data of the processing data is transformed by the correction unit into the values of the coordinate system on the holding sheet 10. Accordingly, the processing data can be transformed, into the processing data indicative of the processing positions and/or orientations of the desired, pattern shapes irrespective of the set position of the holding member relative to the processing apparatus 1.

The transfer mechanism has the rollers holding at least the holding sheet 10 therebetween. The rollers are driven so that transfer mechanism transfers the holding sheet in the set state and so that the transfer mechanism further transfers the holding sheet to discharge the holding sheet into the non-set state. According to this transferring manner, the holding sheet 10 is transferred in the set state or while held between the rollers. This can prevent the holding sheet from, being deviated during transfer with the result that the set position of the holding sheet can be detected precisely.

The processing head 5 includes the cutting unit which cuts the pattern shapes A to C out of the object S. This can apply a high precision cutting without deviation from the pattern, shapes A to C of the object, based on the corrected processing data.

The processing head 5 includes the printing unit which prints the pattern shapes A to C of the object S. This can apply a high precision printing without deviation from the pattern shapes A to C of the object, based on the corrected processing data.

The foregoing examples should not be restrictive but may be modified or expanded as follows. Although the invention is applied to the processing apparatus in the foregoing examples, the invention may be applied to various apparatuses provided with a cutting unit and/or a printing unit.

The image acquisition unit should not be limited to the CIS (the scanner 6). A charge-coupled device (CCD) may be used as the image acquisition unit. This case can achieve the same advantageous effects as the foregoing examples. The correction unit may be configured to carry oat correction based on an amount of deviation calculated by a calculation unit instead of the correction by the affine transform. For example, a correcting process may be carried out to transform, the coordinate data contained in the processing data generated at step S32 and the like while the deviation amount calculated at step S24 serves as an amount of shift (movement).

The data processing program stored in the storage unit of the processing apparatus 1 may be stored in a non-transitory computer-readable storage medium including a USB flash memory, CD-ROM, flexible disc, DVD and flash memory. In this case, when the data processing program stored in the storage medium is read by computers incorporated in various processing apparatuses provided with a cutting unit and/or a printing unit thereby to be executed, the same advantageous effects as achieved by the above-described examples can be achieved by these processing apparatuses.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. An apparatus comprising:
   a cartridge holder configured to receive is pen or a cutter;
   a platen configured to receive a holding member holding an object;
   a first moving mechanism configured to move the cartridge holder in a direction that the cartridge holder comes close to the platen;
   a reading unit configured to read image data from the object and the holding member;
   a second moving mechanism configured to move the holding member to the reading unit; and
   a processor configured to cause the apparatus to:
   instruct the second moving, mechanism to move the holding member to the reading unit;
   instruct the reading unit to read first image data that is an image of a mark provided on the holding member;
   calculate an amount of deviation of a first set position of the holding member by the second moving mechanism in the first image data read by the reading unit, from a reference set position of the object;
   instruct the second moving mechanism to move the holding member to the reading unit;
   instruct the reading unit to read second image data that is an image of a pattern applied to the object held on the holding member;
   generate processing data based on the second image data read by the reading unit;
   correct the generated processing data based on the deviation amount; and control the first and second moving mechanisms based on the corrected processing data to process the object held on the holding member, by the pen or the cutter.

2. The apparatus according to claim 1, further comprising:
   a storage unit configured to readably store the corrected processing data; and
   a detection unit configured to detect the holding member received by the platen,
   wherein the processor is further configured to instruct the apparatus to:
   cause the reading unit to re-obtain first image data with a position of the holding member in the moving direction serving as a second set position when the detection unit has re-detected the holding member re-received by the platen;
   generate, based on the re-obtained image data, corrected data obtained by correcting the processing data read from the storage unit; and
   process the object held on the holding member located at the second set position, based on the corrected data.

3. The apparatus according to claim 1, further comprising a display unit, wherein the processor is further configured to instruct the apparatus to instruct the display unit to display the second image data corrected based on the amount of deviation and the post-correction processing data together.

4. The apparatus according to claim 1, wherein the processing data includes coordinate data indicative of a processing position and/or an orientation of one or more of patterns applied to the object, and
   wherein the correcting of the processing data based on the amount of deviation comprises transforming the coordinate data of the processing data into a value of a coordinate system on the object with a marker included in the first image data serving as a reference.

5. The apparatus according to claim 1, wherein the second moving mechanism comprises rollers configured to hold the holding member therebetween and to move the bolding member.

6. A non-transitory computer-readable medium for an apparatus comprising:
   a cartridge holder configured to receive a pen or a cutter;
   a platen configured to receive a holding member holding an object;
   a first moving mechanism configured to move the cartridge holder in a direction that the cartridge holder comes close to the platen;
   a reading unit configured to read image data from the object and the holding member;
   a second moving mechanism configured to move the bolding member to the reading unit; and
   a processor configured to cause the apparatus to:
   instruct the second moving mechanism to move the holding member to the reading unit;
   instruct the reading unit to read first image data that is an image of a mark provided on the holding member;
   calculate an amount of deviation of a first set position of the holding member by the second moving mechanism in the first image data read by the reading unit from a reference set position of the object;
   instruct the second moving mechanism to move the holding member to the reading unit;
   instruct the reading unit to read second image data that is an image of a pattern applied to the object held on the holding member;
   generate processing data based on the second image data read by the reading unit;
   correct the generated processing data based on the amount of deviation; and
   control the first and second moving mechanisms based on the corrected processing data to process the object held on the holding member, by the pen or the cutter.

7. The medium according to claim 6, wherein the apparatus further comprises a storage unit configured to readably store the corrected processing data and a detection unit configured to detect the object received by the platen,
   wherein the processor is further configured to instruct the apparatus to:
   cause the reading unit to re-obtain first image data with a position of the holding member in the moving direction serving as a second set position when the detection unit has re-detected the holding member re-received by the platen;
   generate, based on the re-obtained image data, corrected data obtained by correcting the processing data read from the storage unit; and
   process the object held on the holding member located at the second set position, based on the corrected data.

8. The medium according to claim 6, wherein the apparatus further comprises a display unit, and
   wherein the computer-readable instructions further cause the apparatus to:

instruct the display unit to display the second image data corrected based on the amount of deviation and the post-correction processing data together.

9. The medium according to claim 6, wherein the processing data includes coordinate data indicative of a processing position and/or an orientation of one or more of patterns applied to the object, and wherein the correcting of the processing data based on the amount of deviation comprises transforming the coordinate data of the processing data into a value of a coordinate system on the object with a marker included in the first image data serving as a reference.

10. The medium according to claim 6, wherein the second moving mechanism comprises rollers configured to hold the holding member therebetween and to move the holding member object.

11. An apparatus comprising:
a pen or a cutter;
a platen configured to receive to holding member holding an object;
a first moving mechanism configured to move the pen or the cutter in a direction that the pen or the cutter comes close to the platen;
a reading unit configured to read image data from the object and the holding member;
a second moving mechanism configured to move the holding member to the reading unit; and
a processor configured to cause the apparatus to:
instruct the second moving mechanism to move the holding member to the reading unit;
instruct the reading unit to read first image data that is an image of a mark provided on the holding member;
calculate an amount of deviation of a first set position of the holding member by the second moving mechanism in the first image data read by the reading unit, from a reference set position of the object;
instruct the second moving mechanism to move the holding member to the reading unit;
instruct the reading unit to read second image data that is an image of a pattern applied to the object held on the holding member;
generate processing data based on the second image data read by the reading unit;
correct the generated processing data based on the amount of deviation; and
control the first and second moving mechanisms based on the corrected processing data to process the object held on the holding member, by the pen or the cutter.

12. The apparatus according to claim 11, further comprising:
a storage unit configured to readably store the corrected processing data; and
as detection unit configured to detect the holding member received by the platen,
wherein the processor is further configured to instruct the apparatus to:
cause the reading unit to re-obtain first image data with a position of the holding member in the moving direction serving as a second set position when the detection unit has re-detected the holding member re-received by the platen;
generate, based on the re-obtained image data, corrected data obtained by correcting the processing data read from the storage unit; and
process the object held on the holding member located at the second set position, based on the corrected data.

13. The apparatus according to claim 11, further comprising a display unit,
wherein the processor is further configured to instruct the apparatus to:
instruct the display unit to display the second image data corrected based on the amount of deviation and the post-correction processing data together.

14. The apparatus according to claim 11, wherein the processing data includes coordinate data indicative of a processing position and/or an orientation of one or more of patterns applied to the object, and wherein the correcting of the processing data based on the amount of deviation comprises transforming the coordinate data of the processing data into a value of a coordinate system on the object with a marker included in the first image data serving as a reference.

15. The apparatus according to claim 11, wherein the second moving mechanism comprises rollers configured to hold the holding member therebetween and to move the holding member.

* * * * *